(12) United States Patent
Sanderson et al.

(10) Patent No.: US 6,446,587 B1
(45) Date of Patent: Sep. 10, 2002

(54) PISTON ENGINE ASSEMBLY

(75) Inventors: Robert A. Sanderson, Denton, TX (US); Albert E. Sanderson, Carlisle, MA (US); Kay Herbert, Winthrop, MA (US)

(73) Assignee: R. Sanderson Management, Inc., Denton, TX (US)

( * ) Notice: Subject to any disclaimer, the term of this patent is extended or adjusted under 35 U.S.C. 154(b) by 0 days.

(21) Appl. No.: 09/276,314

(22) Filed: Mar. 25, 1999

Related U.S. Application Data

(63) Continuation-in-part of application No. 09/154,153, filed on Sep. 15, 1998, now abandoned, which is a continuation-in-part of application No. 08/929,042, filed on Sep. 15, 1997, now abandoned.

(51) Int. Cl.[7] .............................................. F02B 75/18
(52) U.S. Cl. ..................... 123/56.1; 123/63; 123/78 R; 74/60; 403/122; 403/131; 403/135
(58) Field of Search .............................. 123/48 R, 48 B, 123/78 R, 78 F, 61 R, 63, 56.1; 74/60; 403/122, 128, 131, 135, 141, 142, 143; 92/12.2, 71

(56) References Cited

U.S. PATENT DOCUMENTS

| | | |
|---|---|---|
| 748,559 A | 12/1903 | Peet |
| 812,636 A | 2/1906 | Callan |
| 821,546 A | 5/1906 | Smallbone |
| 1,019,521 A | 3/1912 | Pratt |
| 1,161,152 A | 11/1915 | Nyborg |
| 1,194,258 A | 8/1916 | Walker |
| 1,210,649 A | 1/1917 | Holley et al. |
| 1,255,973 A | 2/1918 | Almen |

(List continued on next page.)

FOREIGN PATENT DOCUMENTS

| | | | |
|---|---|---|---|
| DE | 89352 | 12/1895 | |
| DE | 345813 | 7/1917 | |
| DE | 515359 | 12/1930 | |
| DE | 698243 | 10/1940 | ................ 123/56.1 |
| DE | 1 037 799 | 12/1958 | |
| DE | 1 451 926 | 5/1965 | |
| DE | 2346836 A1 | 3/1975 | |
| DE | 2612270 | 9/1977 | |

(List continued on next page.)

OTHER PUBLICATIONS

Freudenstein, "Kinematic Structure of Mechanisms for Fixed and Variable–Stroke Axial–Piston Reciprocating Machines", Journal of Mechanisms, Transmissions, and Automation in Design, vol. 106, pp. 355–363, 1984.
Freudenstein, "Development of an Optimum Variable–Stroke Internal–Combustion Engine Mechanism From the Viewpoint . . . ", Journal of Mechanisms, Transmissions, and Automation in Design, vol. 105, pp. 259–266, 1984.

*Primary Examiner*—Noah P. Kamen
(74) *Attorney, Agent, or Firm*—Fish & Richardson P.C.

(57) ABSTRACT

A variable compression piston assembly includes a plurality of pistons, a transition arm coupled to each of the pistons, and a rotating member mounted for pivoting movement to slide along an axis of the drive member. Movement of the rotating member relative to the drive member changes the compression ratio of the piston assembly. An engine assembly includes first and second piston assemblies mounted back-to-back and 180° out of phase. A joint for positioning between first and second pistons includes an outer member and an inner member. The outer member is configured for movement relative to the pistons along a first axis perpendicular to the common axis of the pistons. The inner member is mounted within the outer member for rotation relative to the outer member about a second axis perpendicular to the first axis and the common axis.

52 Claims, 31 Drawing Sheets

U.S. PATENT DOCUMENTS

| | | | |
|---|---|---|---|
| RE15,442 E | 9/1922 | Almen | |
| 1,577,010 A | * 3/1926 | Whatley | 74/60 |
| 1,648,000 A | 11/1927 | Lee | |
| 1,659,374 A | 2/1928 | Robson | |
| 1,673,280 A | 6/1928 | Evans | |
| 1,772,977 A | 8/1930 | Arrighi | 123/56.1 |
| 1,857,656 A | 5/1932 | Oldfield | |
| 1,894,033 A | 1/1933 | Farwell | |
| 1,968,470 A | 7/1934 | Szombathy | 123/58 |
| 2,042,730 A | 6/1936 | Redrup | 123/190 |
| 2,048,272 A | 7/1936 | Linthicum | 103/173 |
| 2,104,391 A | 1/1938 | Redrup | 74/60 |
| 2,256,079 A | 9/1941 | Dinzl | 103/162 |
| 2,263,561 A | 11/1941 | Biermann | 74/60 |
| 2,302,995 A | 11/1942 | Holmes | |
| 2,465,510 A | 3/1949 | Bonnafe | 103/162 |
| 2,513,083 A | 6/1950 | Eckert | 74/60 |
| 2,532,254 A | 11/1950 | Bouchard | 74/60 |
| 2,539,880 A | 1/1951 | Wildhaber | |
| 2,653,484 A | 9/1953 | Zecher | 74/40 |
| 2,910,973 A | 11/1959 | Witzky | 123/48 |
| 2,940,325 A | 6/1960 | Nakesch | 74/60 |
| 3,000,367 A | 9/1961 | Eagleson | 123/53 |
| 3,076,345 A | 2/1963 | Leclercq | 74/60 |
| 3,077,118 A | 2/1963 | Robbins | 74/60 |
| 3,176,667 A | 4/1965 | Hammer | 123/43 |
| 3,182,644 A | 5/1965 | Drtina | 123/56.1 |
| 3,198,022 A | 8/1965 | Algor de Waern | 74/60 |
| 3,386,425 A | 6/1968 | Morsell | 123/61 R |
| 3,528,317 A | 9/1970 | Cummins | 74/598 |
| 3,654,906 A | 4/1972 | Airas | |
| 3,847,124 A | 11/1974 | Kramer | 123/51 |
| 3,861,829 A | 1/1975 | Roberts et al. | 417/53 |
| 3,877,839 A | 4/1975 | Ifield | |
| 3,939,809 A | 2/1976 | Rohs | 123/58 |
| 3,945,359 A | 3/1976 | Asaga | 123/58 B |
| 3,959,983 A | 6/1976 | Roberts et al. | 62/226 |
| 3,968,699 A | 7/1976 | van Beukering | 74/60 |
| 4,011,842 A | 3/1977 | Davies et al. | 123/61 R |
| 4,066,049 A | 1/1978 | Teodorescu et al. | 123/48 |
| 4,077,269 A | 3/1978 | Hodgkinson | 74/60 |
| 4,094,202 A | 6/1978 | Kemper | 74/60 |
| 4,100,815 A | 7/1978 | Kemper | |
| 4,112,826 A | 9/1978 | Cataldo | 92/13.1 |
| 4,144,771 A | 3/1979 | Kemper et al. | 74/60 |
| 4,152,944 A | 5/1979 | Kemper | 74/191 |
| 4,168,632 A | 9/1979 | Fokker | 74/60 |
| 4,174,684 A | 11/1979 | Roseby et al. | 123/48 |
| 4,178,135 A | 12/1979 | Roberts | 417/222 |
| 4,178,136 A | 12/1979 | Reid et al. | 417/269 |
| 4,203,396 A | 5/1980 | Berger | 123/58 |
| 4,208,926 A | 6/1980 | Hanson | 74/191 |
| 4,235,116 A | 11/1980 | Meijer et al. | 74/60 |
| 4,270,495 A | 6/1981 | Freudenstein et al. | 123/54 |
| 4,285,303 A | 8/1981 | Leach | 123/51 |
| 4,285,640 A | 8/1981 | Mukai | 417/269 |
| 4,294,139 A | 10/1981 | Bex et al. | 74/839 |
| 4,297,085 A | 10/1981 | Brucken | 417/222 |
| 4,342,544 A | 8/1982 | Pere | |
| 4,418,586 A | 12/1983 | Maki et al. | 74/831 |
| 4,433,596 A | 2/1984 | Scalzo | 74/839 |
| 4,489,682 A | 12/1984 | Kenny | 123/58 |
| 4,491,057 A | 1/1985 | Ziegler | 91/503 |
| 4,513,630 A | 4/1985 | Pere et al. | |
| 4,569,314 A | 2/1986 | Milu | 123/58 |
| 4,708,099 A | 11/1987 | Ekker | 123/54 A |
| 4,776,259 A | 10/1988 | Takai | 92/71 |
| 4,780,060 A | 10/1988 | Terauchi | 417/222 |
| 4,852,418 A | 8/1989 | Armstrong | 74/60 |
| 4,869,212 A | 9/1989 | Sverdlin | 123/56 |
| 4,920,859 A | 5/1990 | Smart et al. | 91/497 |
| 4,966,042 A | 10/1990 | Brown | |
| 5,002,466 A | 3/1991 | Inagaki et al. | |
| 5,007,385 A | 4/1991 | Kitaguchi | 123/48 |
| 5,025,757 A | 6/1991 | Larsen | 123/48 |
| 5,027,756 A | 7/1991 | Shaffer | 123/58 |
| 5,094,195 A | 3/1992 | Gozalez | 123/58 |
| 5,113,809 A | 5/1992 | Ellenburg | 123/58 |
| 5,129,797 A | 7/1992 | Kanamaru | 417/500 |
| 5,136,987 A | 8/1992 | Schechter et al. | 123/48 |
| 5,201,261 A | 4/1993 | Kayukawa et al. | |
| 5,261,358 A | 11/1993 | Rorke | 123/47 R |
| 5,280,745 A | 1/1994 | Maruno | 91/477 |
| 5,329,893 A | 7/1994 | Drangel et al. | 123/78 |
| 5,336,056 A | 8/1994 | Kimura et al. | 417/222 |
| 5,437,251 A | 8/1995 | Anglim et al. | |
| 5,535,709 A | 7/1996 | Yashizawa | 123/63 |
| 5,542,382 A | 8/1996 | Clarke | |
| 5,553,582 A | 9/1996 | Speas | 423/56.4 |
| 5,562,069 A | 10/1996 | Gillbrand et al. | 123/48 |
| 5,572,904 A | 11/1996 | Minculescu | 74/45 |
| 5,596,920 A | 1/1997 | Umemura et al. | |
| 5,605,120 A | 2/1997 | Hedelin | 123/78 |
| 5,630,351 A | 5/1997 | Clucas | |
| 5,634,852 A | 6/1997 | Kanamaru | 464/138 |
| 5,699,716 A | 12/1997 | Ota et al. | |
| 5,762,039 A | 6/1998 | Gonzalez | 123/197.3 |
| 5,768,974 A | 6/1998 | Ikeda et al. | |
| 5,782,219 A | 7/1998 | Frey et al. | |
| 5,785,503 A | 7/1998 | Ota et al. | |
| 5,839,347 A | 11/1998 | Nomura et al. | |
| 5,890,462 A | 4/1999 | Bassett | 123/56.2 |
| 5,894,782 A | 4/1999 | Nissen et al. | |
| 5,897,298 A | 4/1999 | Umemura | |
| 6,053,091 A | 4/2000 | Tojo | |

FOREIGN PATENT DOCUMENTS

| | | | |
|---|---|---|---|
| DE | 26 12 270 | 9/1977 | |
| DE | 27 51 846 | 11/1977 | |
| DE | 29 31 377 | 2/1981 | |
| DE | 37 00 005 A1 | 7/1988 | |
| EP | 0052387 | 10/1991 | |
| FR | 461343 | 12/1913 | |
| FR | 815794 | 4/1937 | |
| FR | 1015857 | 10/1952 | |
| FR | 1416219 | 9/1965 | |
| FR | 1450354 | 7/1966 | |
| FR | 2271459 | 11/1973 | |
| FR | 2453332 | 4/1979 | |
| FR | 2 566 460 | 12/1985 | 123/56.1 |
| GB | 121961 | 1/1920 | |
| GB | 220594 | * 3/1924 | |
| GB | 282125 | 12/1927 | |
| GB | 629318 | * 9/1947 | |
| GB | 651893 | 4/1951 | |
| GB | 2 030 254 | 10/1978 | |
| GB | 1595600 | 8/1981 | |
| JP | 55-37541 | 9/1978 | |
| JP | 60-164677 | 8/1985 | |
| JP | 61-212656 | 9/1986 | |
| JP | 62-113938 | 4/1987 | |
| JP | 09151840 | 6/1997 | |
| WO | WO 91/02889 | 3/1991 | |
| WO | WO 92/11449 | 7/1992 | 123/56.1 |
| WO | WO 97/10415 | 3/1997 | |

* cited by examiner

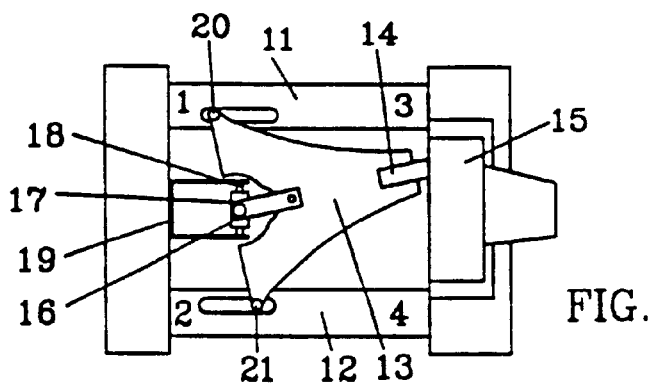 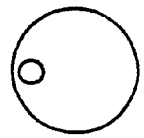
FIG. 3        FIG. 3a
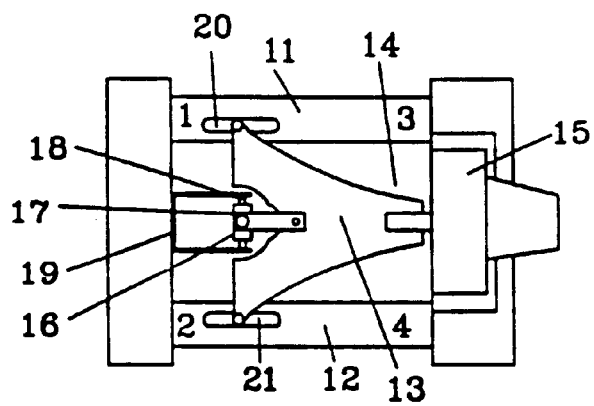 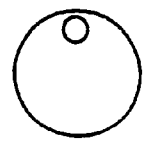
FIG. 4        FIG. 4a
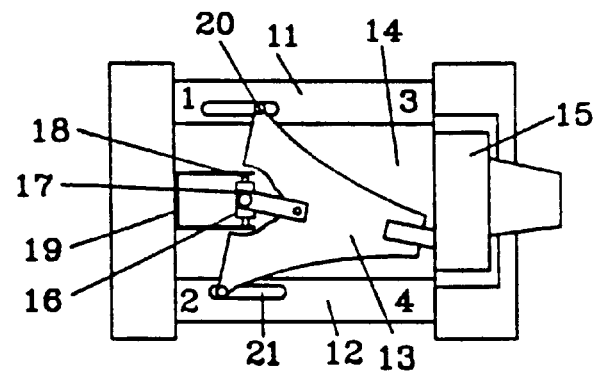 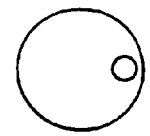
FIG. 5        FIG. 5a
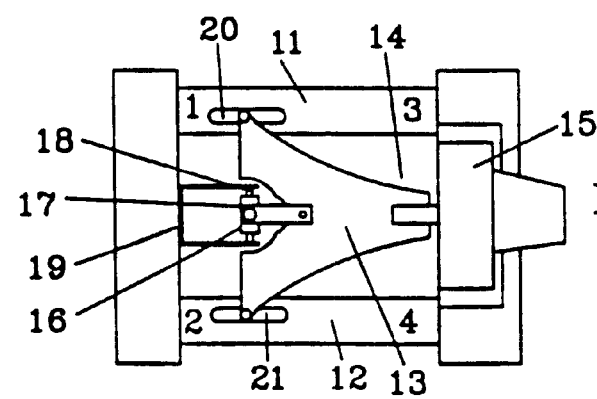 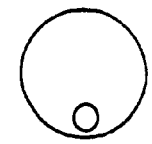
FIG. 6        FIG. 6a

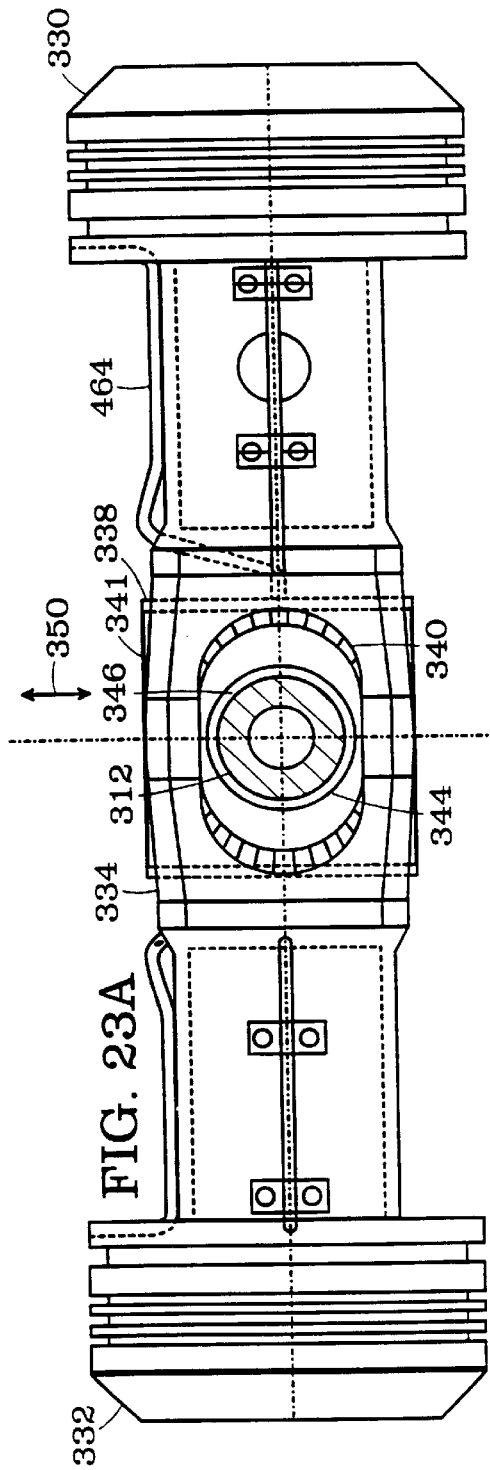
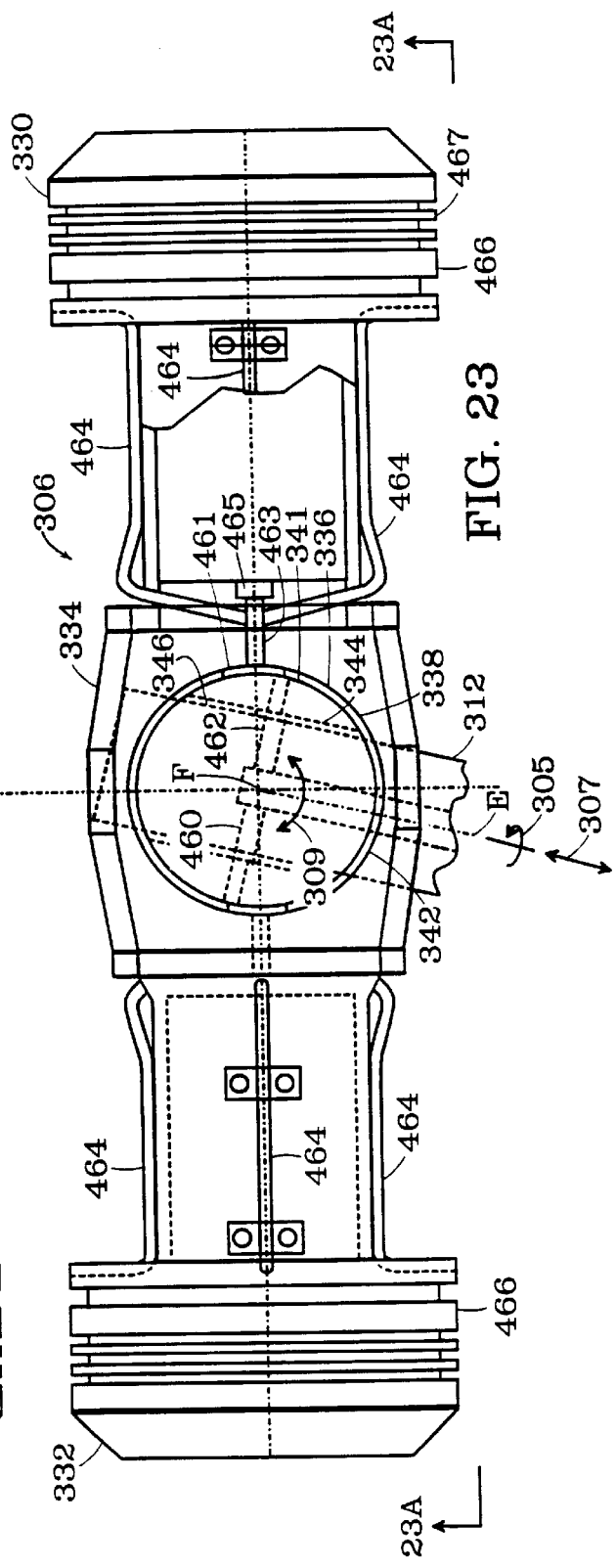

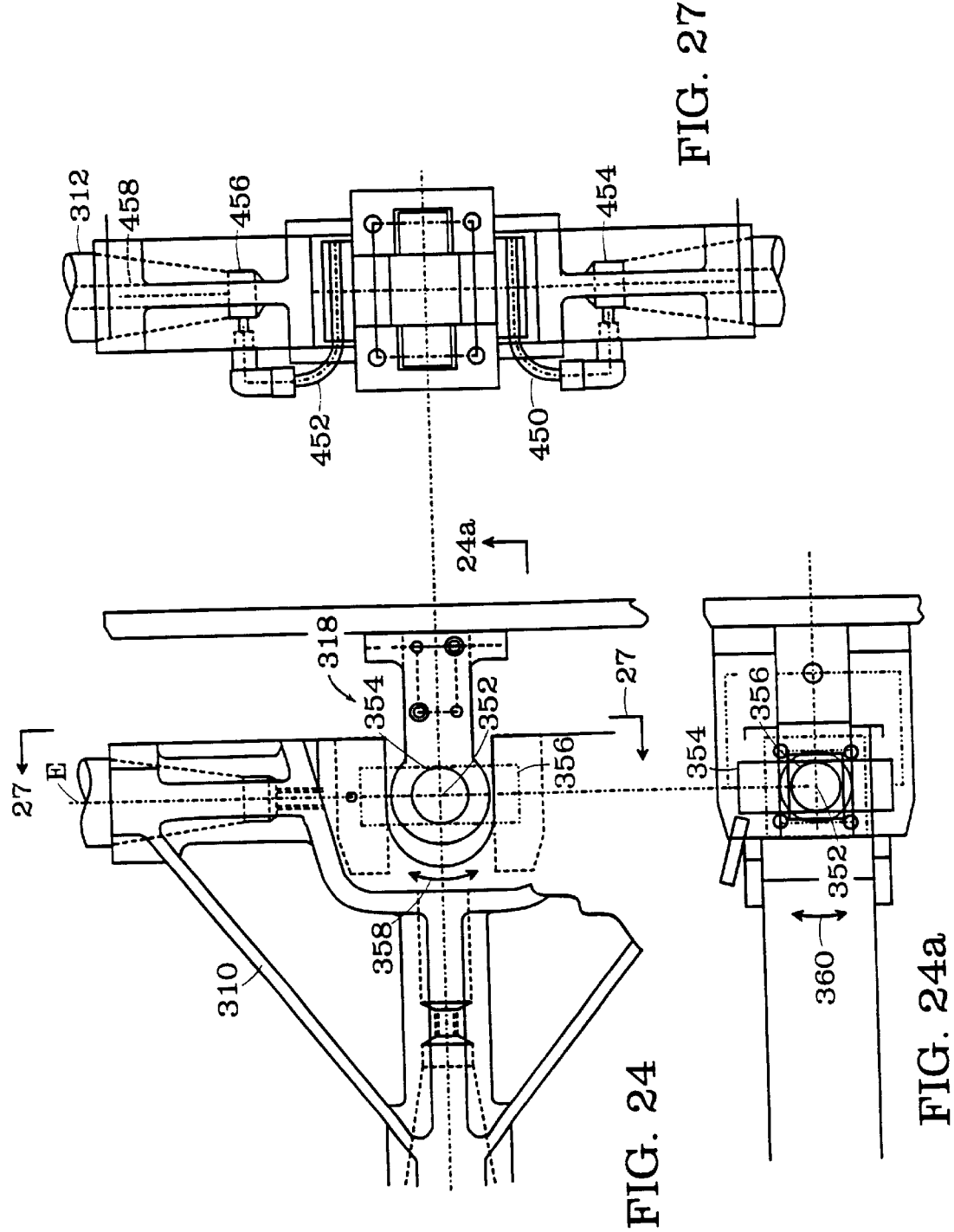

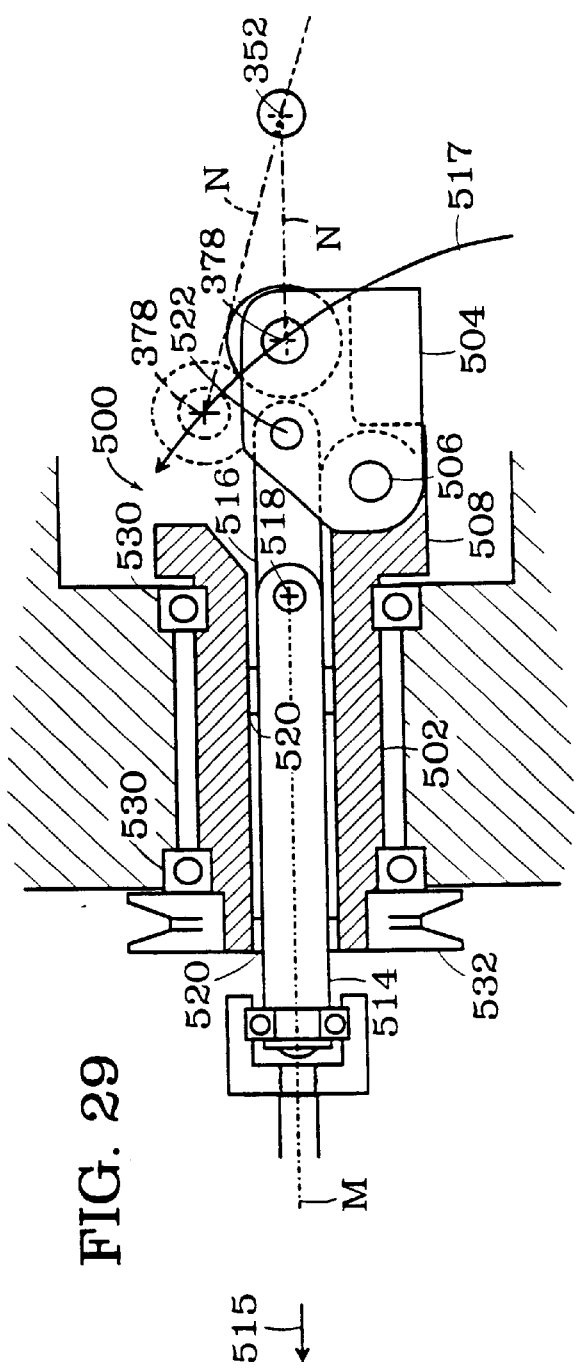
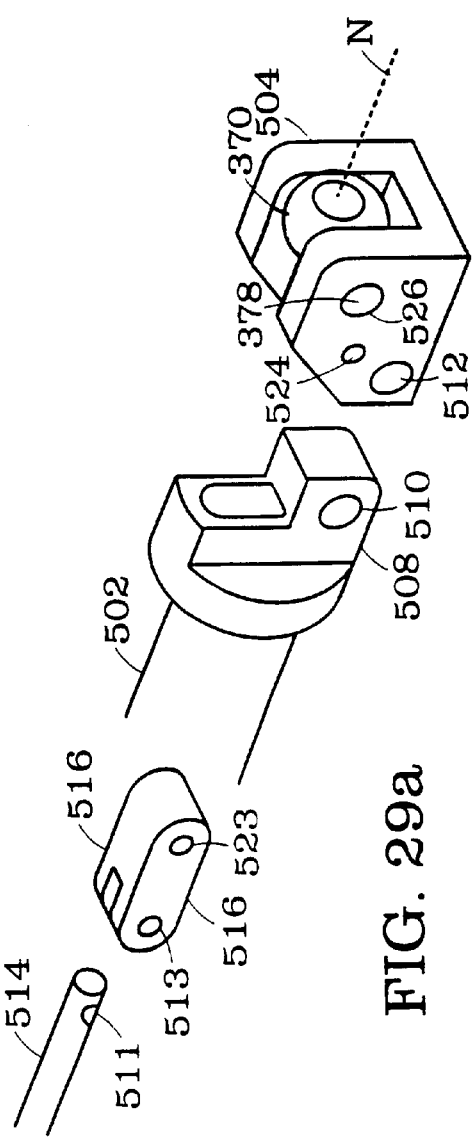
FIG. 29
FIG. 29a

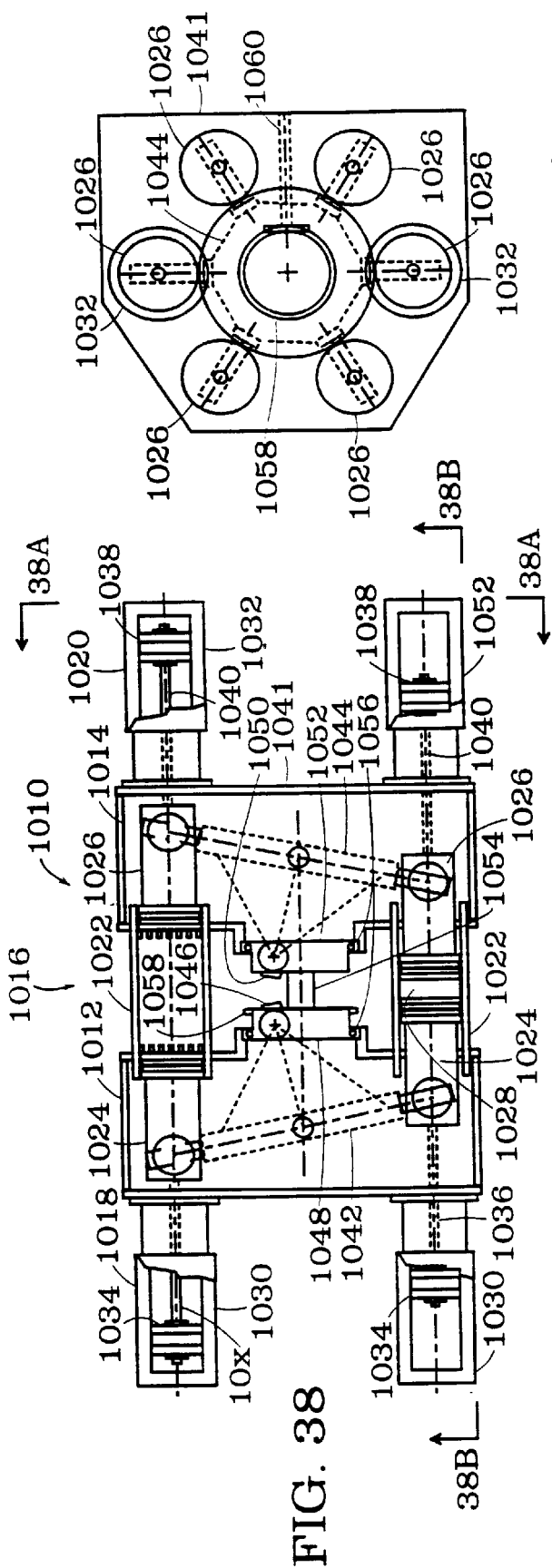
FIG. 38
FIG. 38A
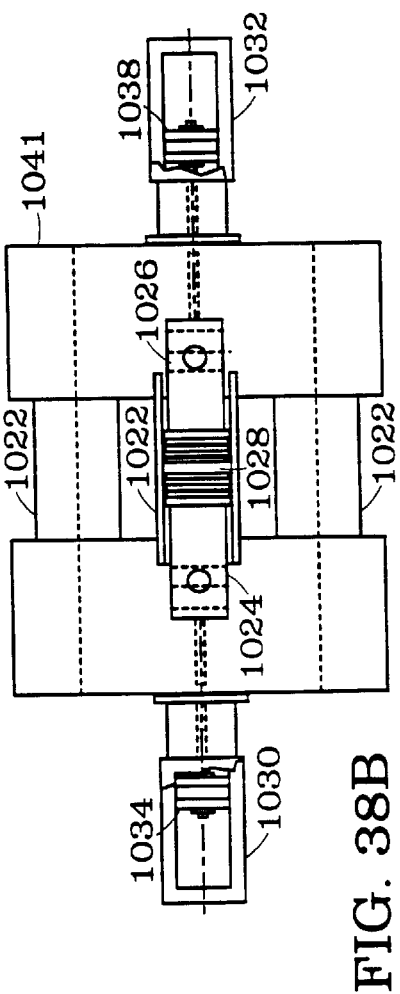
FIG. 38B

PISTON ENGINE ASSEMBLY

This application is a continuation-in-part of application Ser. No. 09/154,153, filed Sep. 15, 1998, entitled VARIABLE COMPRESSION PISTON ASSEMBLY, abandoned, which is a continuation-in-part of application Ser. No. 08/929,042, filed Sep. 15, 1997, entitled DOUBLE ENDED PISTON ENGINE, abandoned.

BACKGROUND OF THE INVENTION

The invention relates to a variable compression piston assembly, and to an engine that has double ended pistons connected to a universal joint for converting linear motion of the pistons to rotary motion.

Most piston driven engines have pistons that are attached to offset portions of a crankshaft such that as the pistons are moved in a reciprocal direction transverse to the axis of the crankshaft, the crankshaft will rotate.

U.S. Pat. No. 5,535,709, defines an engine with a double ended piston that is attached to a crankshaft with an off set portion. A lever attached between the piston and the crankshaft is restrained in a fulcrum regulator to provide the rotating motion to the crankshaft.

U.S. Pat. No. 4,011,842, defines a four cylinder piston engine that utilizes two double ended pistons connected to a T-shaped T-shaped connecting member that causes a crankshaft to rotate. The T-shaped connecting member is attached at each of the T-cross arm to a double ended piston. A centrally located point on the T-cross arm is rotatably attached to a fixed point, and the bottom of the T is rotatably attached to a crank pin which is connected to the crankshaft by a crankthrow which includes a counter weight.

In each of the above examples, double ended pistons are used that drive a crankshaft that has an axis transverse to the axis of the pistons.

SUMMARY OF THE INVENTION

According to the invention, a variable compression piston assembly includes a plurality of pistons, a transition arm coupled to each of the pistons, and a rotating member coupled to a drive member of the transition arm and mounted for pivoting movement to slide along an axis of the drive member. Movement of the rotating member relative to the drive member changes the compression ratio of the piston assembly.

Embodiments of this aspect of the invention may include one or more of the following features.

The pistons are double ended pistons. The transition arm is coupled to each of the double ended pistons at approximately a center of each double ended piston. There are two pistons and the axis of rotation of the rotating member and axes of the two pistons lie on a common plane.

In certain illustrated embodiments, the rotating member is a flywheel. A counterweight is mounted to the rotating member. The rotating member is pivotably mounted to a main drive shaft. The axis of the main drive shaft is parallel to the axis of each of the pistons.

A movable pressure plate is in contact with a peripheral region of the rotating member. A roller interfaces the pressure plate and the rotating member. A piston biases the rotating member into contact with the pressure plate.

The drive member extends into an opening in the rotatable member adjacent to a periphery of the rotatable member. The drive arm extends into a pivot pin located in the rotatable member. A universal joint connects the transition arm to a support.

According to another aspect of the invention, a method for varying the compression ratio of a piston assembly includes providing a plurality of pistons, a transition arm coupled to each of the pistons, and a rotating member coupled to a drive member of the transition arm and mounted for pivoting movement to slide along an axis of the drive member. The method includes pivoting the rotating member to change the compression ratio of the piston assembly.

According to another aspect of the invention, a method of increasing the efficiency of a piston assembly includes providing a plurality of double ended pistons, a transition arm coupled to each of the double ended pistons at approximately a center of each of the pistons, and a rotating member coupled to a drive member of the transition arm and mounted for pivoting movement to slide along an axis of the drive member. The method includes pivoting the rotating member to change the compression ratio of the double ended piston assembly.

According to another aspect of the invention, a joint for positioning between first and second elements arranged for linear motion along a common axis includes an outer member and an inner member. The outer member is configured for movement relative to the first and second elements along a first axis perpendicular to the common axis. The inner member is mounted within the outer member for rotation relative to the outer member about a second axis perpendicular to the first axis and the common axis. The outer and inner members each define an opening for receiving a drive arm.

Embodiments of this aspect of the invention may include one or more of the following features.

The outer member is configured for movement relative to the first and second elements along the second axis. The outer member defines first and second parallel flat sides each defining a plane perpendicular to the common axis. First and second sliding members are positioned between the first flat side and the first element and the second flat side and the second element, respectively. The flat sides have a polished surface.

The first and second elements are pistons. Alternatively, the first element is a piston and the second element is a guided rod, e.g., of a compressor.

The drive arm defines a longitudinal axis and the joint includes a mount, e.g., a cap screw, for holding the drive arm axially stationary while permitting the drive arm to rotate about its longitudinal axis.

In an illustrated embodiment, the opening in the inner member for receiving the drive arm is a channel defining a channel axis perpendicular to the second axis. The opening in the outer member for receiving the drive arm is a slot for accommodating movement of the drive arm when the inner member rotates relative to outer member.

A thrust bearing receives an axial load transferred to the drive arm by the first and second elements. A sleeve bearing receives a normal load transferred to the drive arm by the first and second elements. There is also a bearing located between the inner and outer members.

The first and second elements are mounted to a connector and the connector defines a cavity within which the outer and inner members are positioned.

According to another aspect of the invention, a piston assembly includes first and second elements configured for linear motion along a common axis and a joint positioned between the first and second elements. At least one of the first and second elements is a piston.

According to another aspect of the invention, a method of reducing side load in a double ended member having first and second elements arranged for linear motion along an axis of the double ended member includes providing a joint located between the first and second elements, and transferring load between the first and second elements and a drive arm mounted to the joint through two opposed surfaces, e.g., flat surfaces, of an outer member of the joint.

According to another aspect of the invention, an engine assembly includes a first piston assembly including at least two engine pistons coupled by a transition arm, and a second piston assembly coupled to the first piston assembly. The second piston assembly including at least two engine pistons coupled by a transition arm. The first and second piston assemblies are mounted back-to-back and 180° out of phase.

Embodiments of this aspect of the invention may include one or more of the following features. The engine pistons are housed in cylinders with pairs of engine pistons from the first and second piston assemblies sharing a common cylinder. Each piston assembly includes compressor pistons mounted to move with respective engine pistons. Each piston assembly includes six pistons and two compressors.

In an illustrated embodiment, a first rotating member is mounted to the transition arm of the first piston assembly, and a second rotating member is mounted to the transition arm of the second piston assembly. The second rotating member is coupled to the first rotating member.

According to another aspect of the invention, a method of cancelling vibration in an engine assembly includes providing a first piston assembly including at least two engine pistons coupled by a transition arm, providing a second piston assembly including at least two engine pistons coupled by a transition arm, and coupling the first and second piston assemblies in a back-to-back relationship and 180° out of phase.

BRIEF DESCRIPTION OF THE DRAWINGS

FIGS. 3, 4, 5 and 6 are a top views of the engine of FIG. 1 showing the pistons and flywheel in four different positions;

FIG. 23 is a top view of one of the double ended pistons of the assembly of FIG. 22;

FIG. 23a is a side view of the double ended piston of FIG. 23, taken along lines 23A, 23A;

FIG. 24 is a top view of a transition arm and universal joint of the piston assembly of FIG. 22;

FIG. 24a is a side view of the transition arm and universal joint of FIG. 24, taken along lines 24a, 24a;

FIG. 25b is a side view of the rotatable member, taken along lines 25b, 25b of FIG. 25a;

FIG. 27 is an end view of the transition arm, taken along lines 27, 27 of FIG. 24;

FIG. 29 is a cross-sectional side view of a zero-stroke coupling;

FIG. 29a is an exploded view of the zero-stroke coupling of FIG. 29;

FIG. 38 is a top view of an engine/compressor assembly; and

FIG. 38A is an end view and FIG. 38B is a side view of the engine/compressor assembly, taken along lines 38A, 38A and 38B, 38B, respectively, of FIG. 38.

DESCRIPTION OF THE PREFERRED EMBODIMENTS

Figure 1:
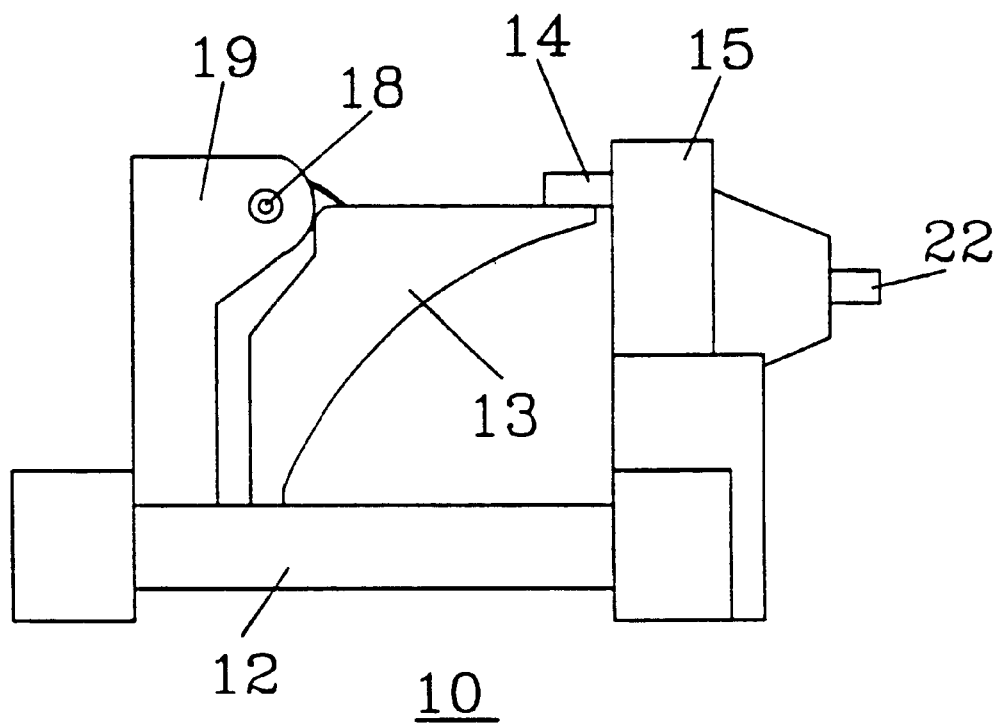
FIGS. 1 and 2 are side view of a simplified illustration of a four cylinder engine of the present invention.

FIG. 1 is a pictorial representation of a four piston engine 10 of the present invention. Engine 10 has two cylinders 11 (FIG. 3) and 12. Each cylinder 11 and 12 house a double ended piston. Each double ended piston is connected to transition arm 13 which is connected to flywheel 15 by shaft 14. Transition arm 13 is connected to support 19 by a universal joint mechanism, including shaft 18, which allows transition arm 13 to move up an down and shaft 18 which allows transition arm 13 to move side to side. FIG. 1 shows flywheel 15 in a position shaft 14 at the top of wheel 15.

Figure 2:
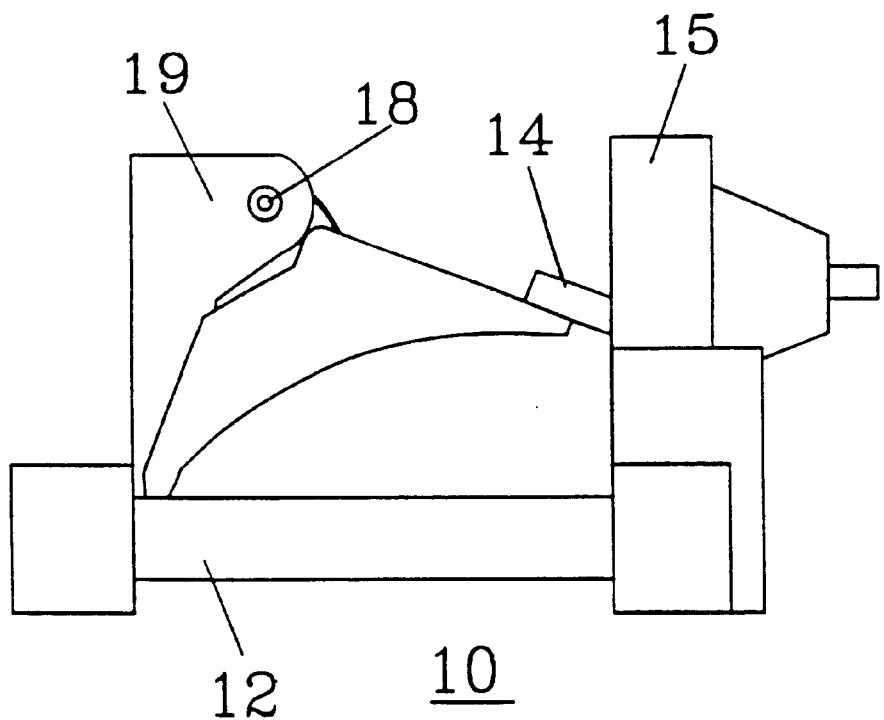

FIG. 2 shows engine 10 with flywheel 15 rotated so that shaft 14 is at the bottom of flywheel 15. Transition arm 13 has pivoted downward on shaft 18.

FIGS. 3–6 show a top view of the pictorial representation, showing the transition arm 13 in four positions and shaft moving flywheel 15 in 90° increments. FIG. 3 shows flywheel 15 with shaft 14 in the position as illustrated in FIG. 3a. When piston 1 fires and moves toward the middle of cylinder 11, transition arm 13 will pivot on universal joint 16 rotating flywheel 15 to the position shown in FIG. 2. Shaft 14 will be in the position shown in FIG. 4a. When piston 4 is fired, transition arm 13 will move to the position shown in FIG. 5. Flywheel 15 and shaft 14 will be in the position shown in FIG Sa. Next piston 2 will fire and transition arm 13 will be moved to the position shown in FIG. 6. Flywheel 15 and shaft 14 will be in the position shown in FIG. 6a. When piston 3 is fired, transition arm 13 and flywheel 15 will return to the original position that shown in FIGS. 3 and 3a.

When the pistons fire, transition arm will be moved back and forth with the movement of the pistons. Since transition arm 13 is connected to universal joint 16 and to flywheel 15 through shaft 14, flywheel 15 rotates translating the linear motion of the pistons to a rotational motion.

Figure 7:
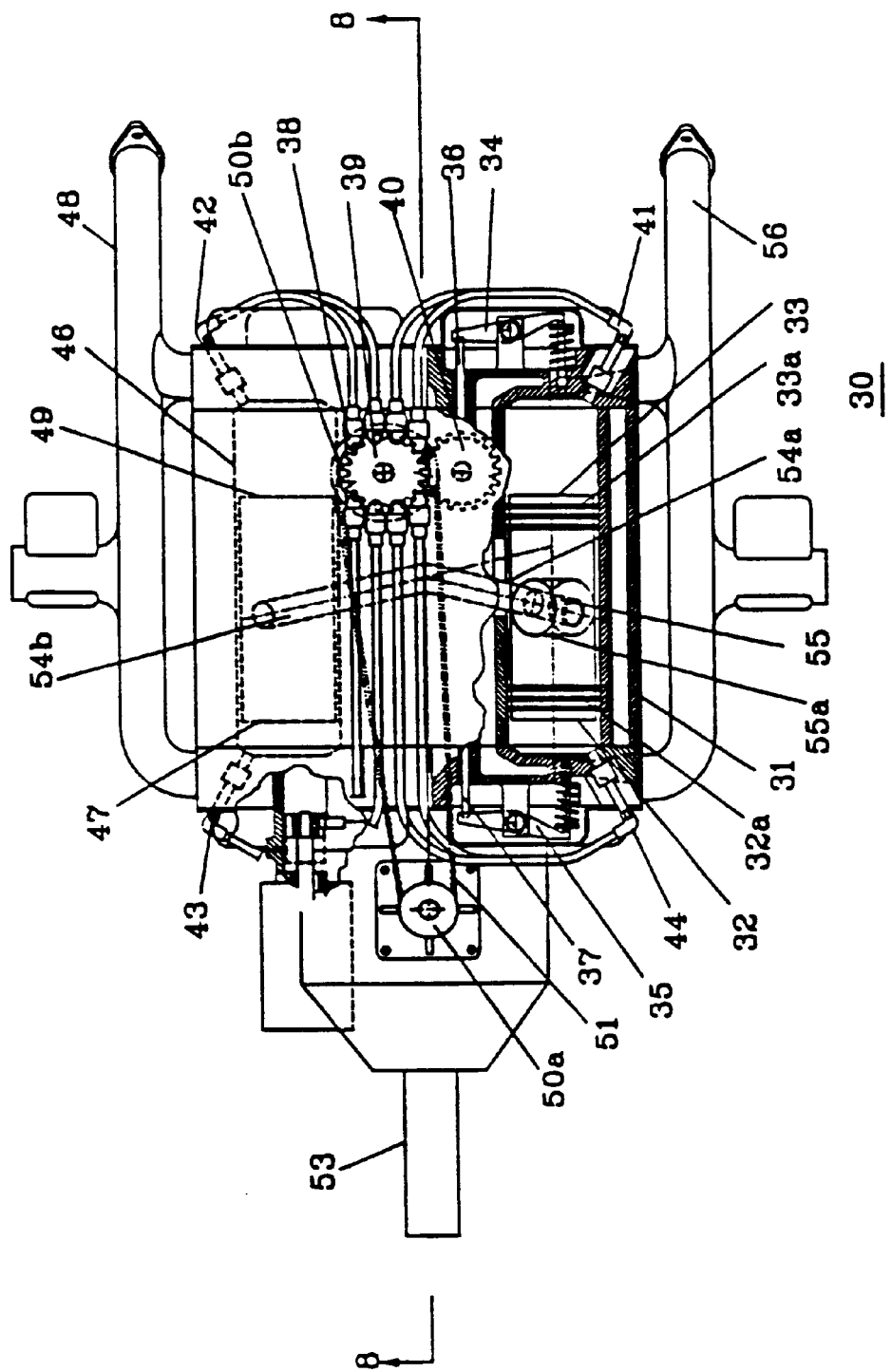
FIG. 7 is a top view, partially in cross-section of an eight cylinder engine of the present invention.

FIG. 7 shows (in partial cross-section) a top view of an embodiment of a four double piston, eight cylinder engine 30 according to the present invention. There are actually only four cylinders, but with a double piston in each cylinder, the engine is equivalent to a eight cylinder engine. Two cylinders 31 and 46 are shown. Cylinder 31 has double ended piston 32, 33 with piston rings 32a and 33a, respectively. Pistons 32, 33 are connected to a transition arm 60 (FIG. 8) by piston arm 54a extending into opening 55a in piston 32, 33 and sleeve bearing 55. Similarly piston 47, 49, in cylinder 46 is connected by piston arm 54b to transition arm 60.

Each end of cylinder 31 has inlet and outlet valves controlled by a rocker arms and a spark plug. Piston end 32 has rocker arms 35a and 35b and spark plug 44, and piston end 33 has rocker arms 34a and 34b, and spark plug 41. Each piston has associated with it a set of valves, rocker arms and a spark plug. Timing for firing the spark plugs and opening and closing the inlet and exhaust values is controlled by a timing belt 51 which is connected to pulley 50a. Pulley 50a is attached to a gear 64 by shaft 63 (FIG. 8) turned by output shaft 53 powered by flywheel 69. Belt 50a also turns pulley 50b and gear 39 connected to distributor 38. Gear 39 also turns gear 40. Gears 39 and 40 are attached to cam shaft 75 (FIG. 8) which in turn activate push rods that are attached to the rocker arms 34, 35 and other rocker arms not illustrated.

Exhaust manifolds 48 and 56 as shown attached to cylinders 46 and 31 respectively. Each exhaust manifold is attached to four exhaust ports.

Figure 8:
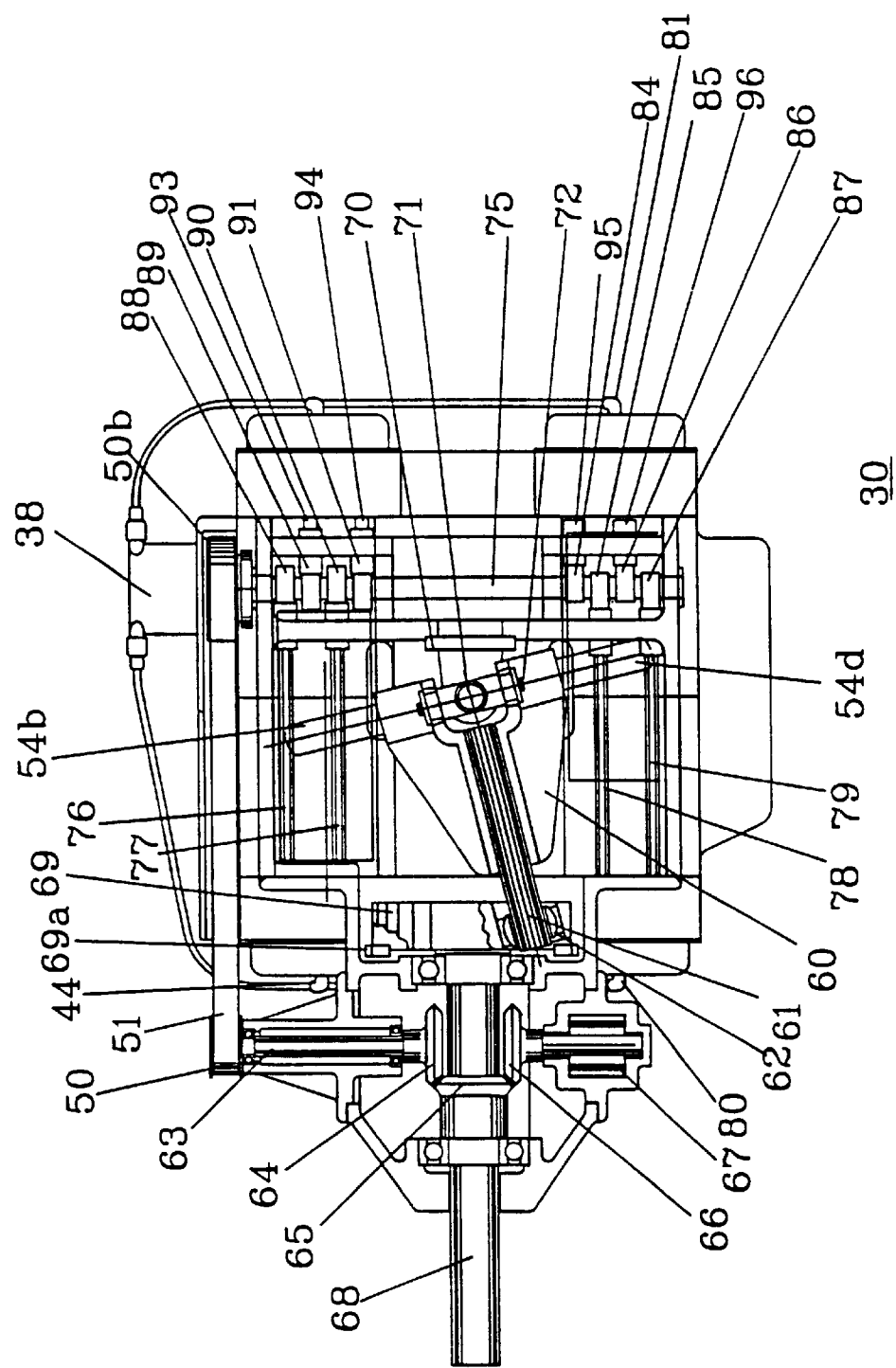
FIG. 8 is a side view in cross-section of the engine of FIG. 7.

FIG. 8 is a side view of engine 30, with one side removed, and taken through section 8—8 of FIG. 7. Transitions arm 60 is mounted on support 70 by pin 72 which allows transition arm to move up and down (as viewed in FIG. 8) and pin 71 which allows transition arm 60 to move from side to side. Since transition arm 60 can move up and down while moving side to side, then shaft 61 can drive flywheel 69 in a circular path. The four connecting piston arms (piston arms 54b and 54d shown in FIG. 8) are driven by the four double end pistons in an oscillator motion around pin 71. The end of shaft 61 in flywheel 69 causes transition arm to move up and down as the connection arms move back and forth. Flywheel 69 has gear teeth 69a around one side which may be used for turning the flywheel with a starter motor 100 (FIG. 11) to start the engine.

The rotation of flywheel 69 and drive shaft 68 connected thereto, turns gear 65 which in turn turns gears 64 and 66. Gear 64 is attached to shaft 63 which turns pulley 50a. Pulley 50a is attached to belt 51. Belt 51 turns pulley 50b and gears 39 and 40 (FIG. 7). Cam shaft 75 has cams 88–91 on one end and cams 84–87 on the other end. Cams 88 and 90 actuate push rods 76 and 77, respectively. Cams 89 and 91 actuate push rods 93 and 94, respectively. Cams 84 and 86 actuate push rods 95 and 96, respectively, and cams 85 and 87 actuate push rods 78 and 79, respectively. Push rods 77, 76, 93, 94, 95, 96 and 78, 79 are for opening and closing the intake and exhaust valves of the cylinders above the pistons. The left side of the engine, which has been cutaway, contains an identical, but opposite valve drive mechanism.

Gear 66 turned by gear 65 on drive shaft 68 turns pump 67, which may be, for example, a water pump used in the engine cooling system (not illustrated), or an oil pump.

Figure 9:
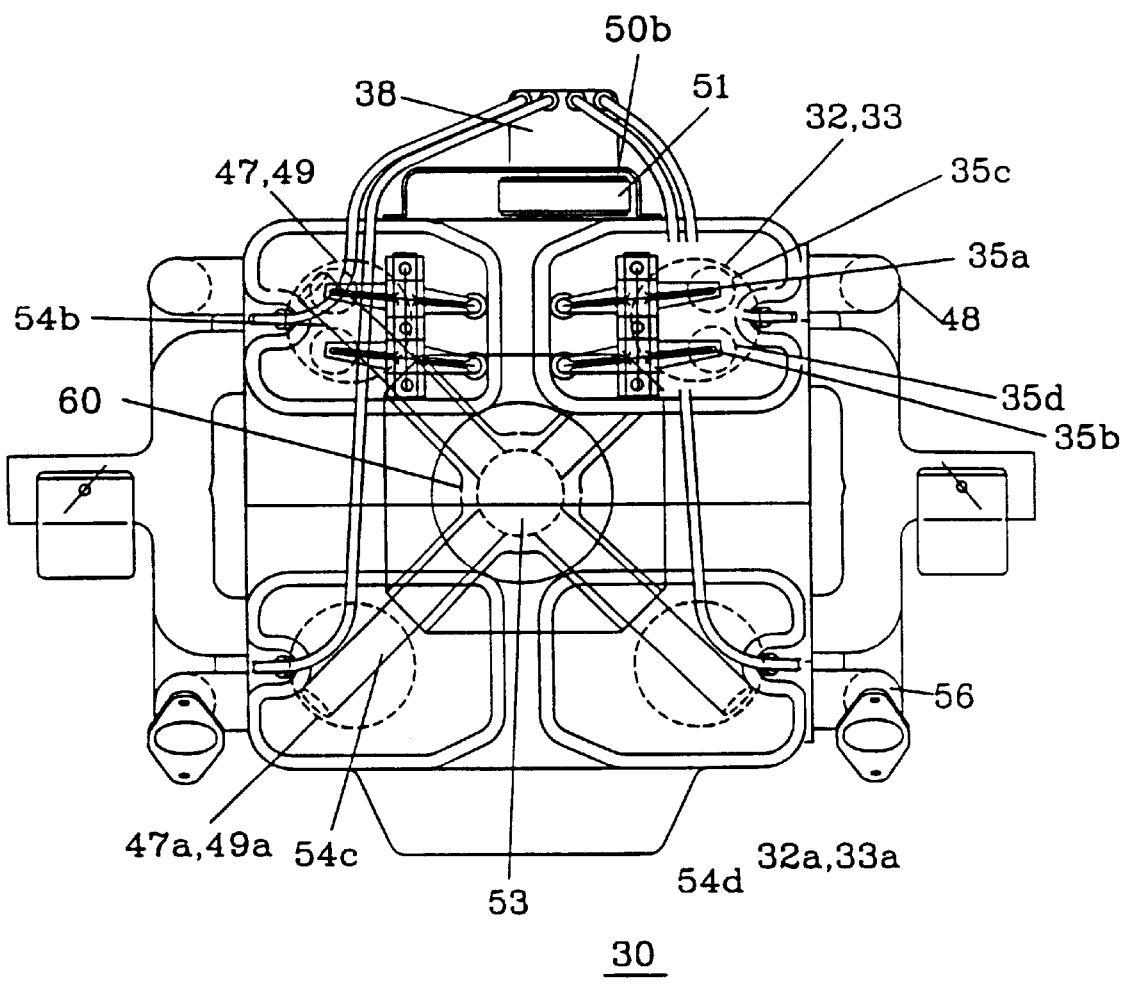
FIG. 9 is a right end view of FIG. 7.

FIG. 9 is a rear view of engine 30 showing the relative positions of the cylinders and double ended pistons. Piston 32, 33 is shown in dashed lines with valves 35c and 35d located under lifter arms 35a and 35b, respectively. Belt 51 and pulley 50b are shown under distributor 38. Transition arm 60 and two, 54c and 54d, of the four piston arms 54a, 54b, 54c and 54d are shown in the pistons 32–33, 32a–33a, 47–49 and 47a–49a.

Figure 10:
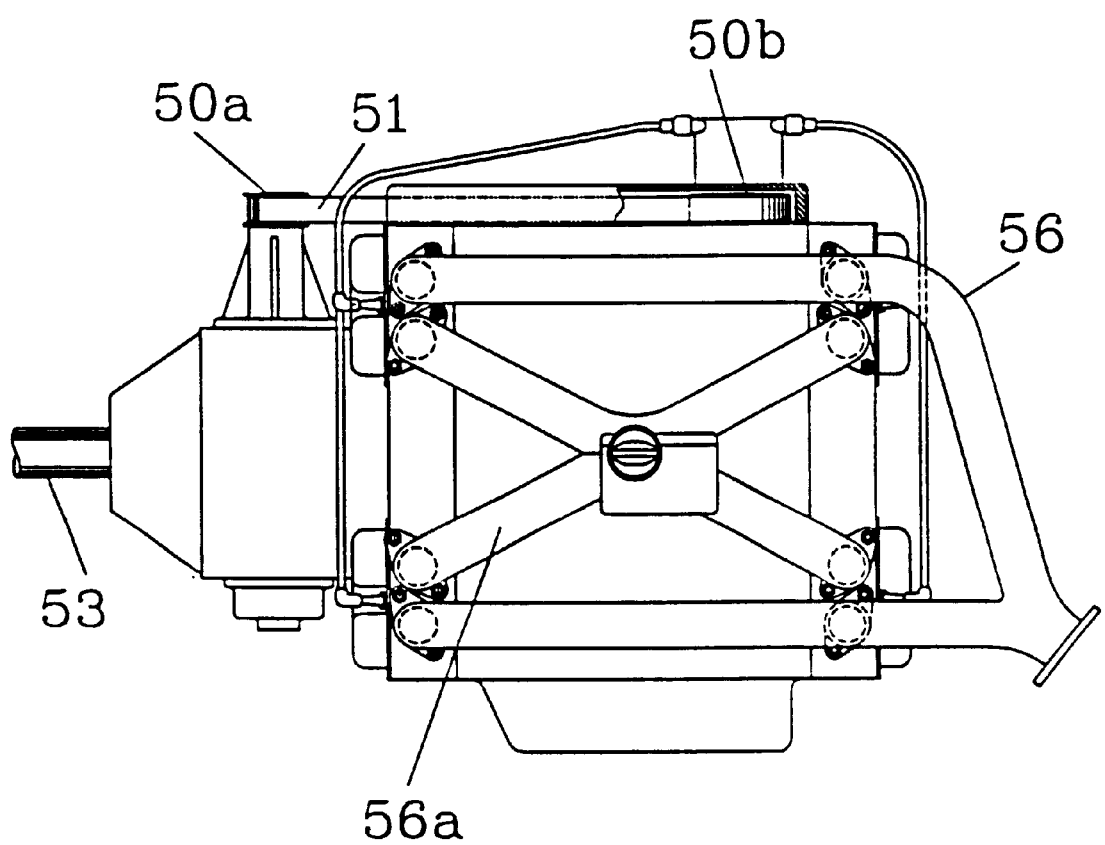
FIG. 10 is a side view of FIG. 7.

FIG. 10 is a side view of engine 30 showing the exhaust manifold 56, intake manifold 56a and carburetor 56c. Pulleys 50a and 50b with timing belt 51 are also shown.

Figure 11:
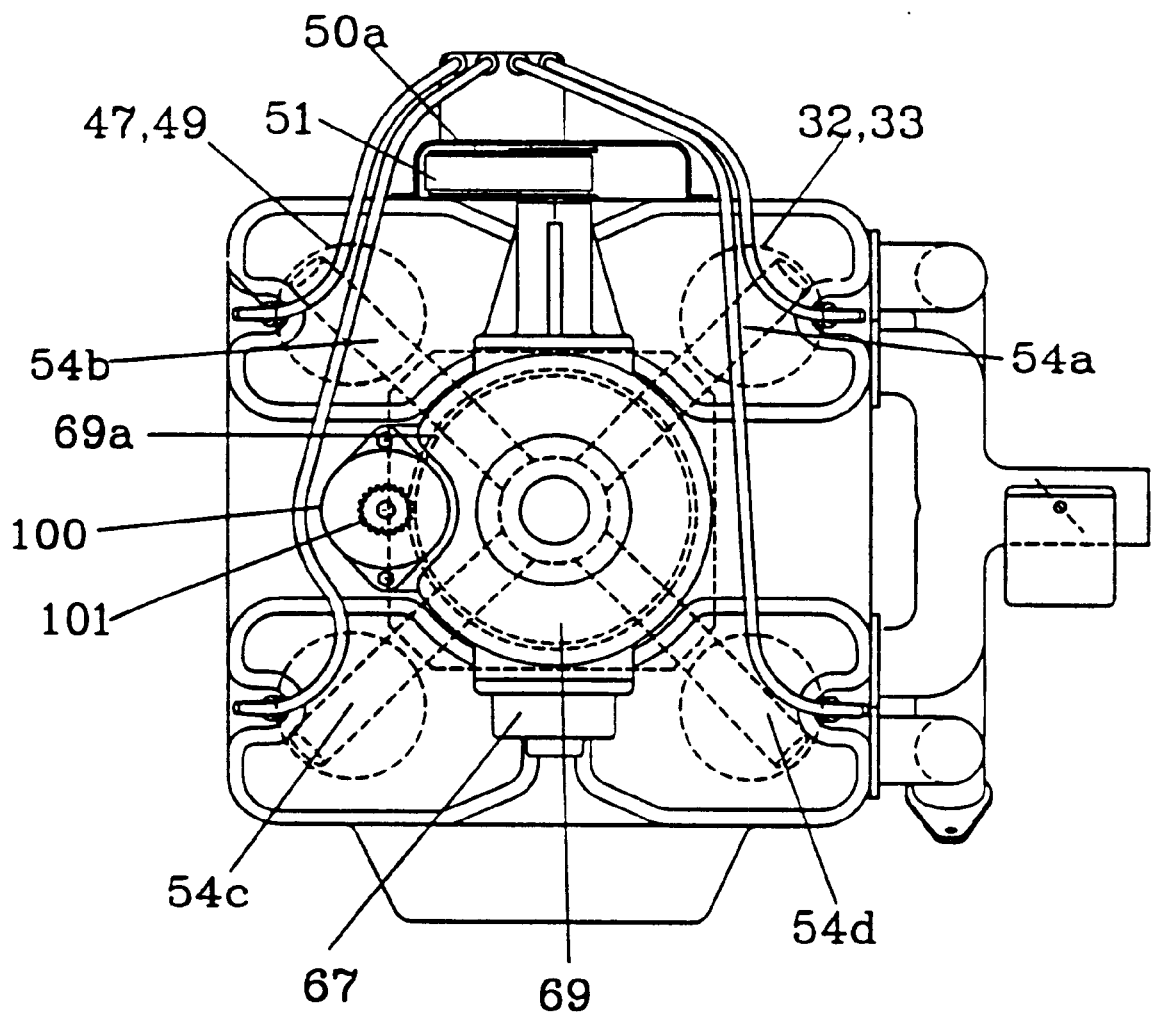
FIG. 11 is a left end view of FIG. 7.

FIG. 11 is a front end view of engine 30 showing the relative positions of the cylinders and double ended pistons 32–33, 32a–33a, 47–49 and 47a–49a with the four piston arms 54a, 54b, 54c and 54d positioned in the pistons. Pump 67 is shown below shaft 53, and pulley 50a and timing belt 51 are shown at the top of engine 30. Starter 100 is shown with gear 101 engaging the gear teeth 69a on flywheel 69.

A feature of the invention is that the compression ratio for the engine can be changed while the engine is running. The end of arm 61 mounted in flywheel 69 travels in a circle at the point where arm 61 enters flywheel 69.

Figure 12:
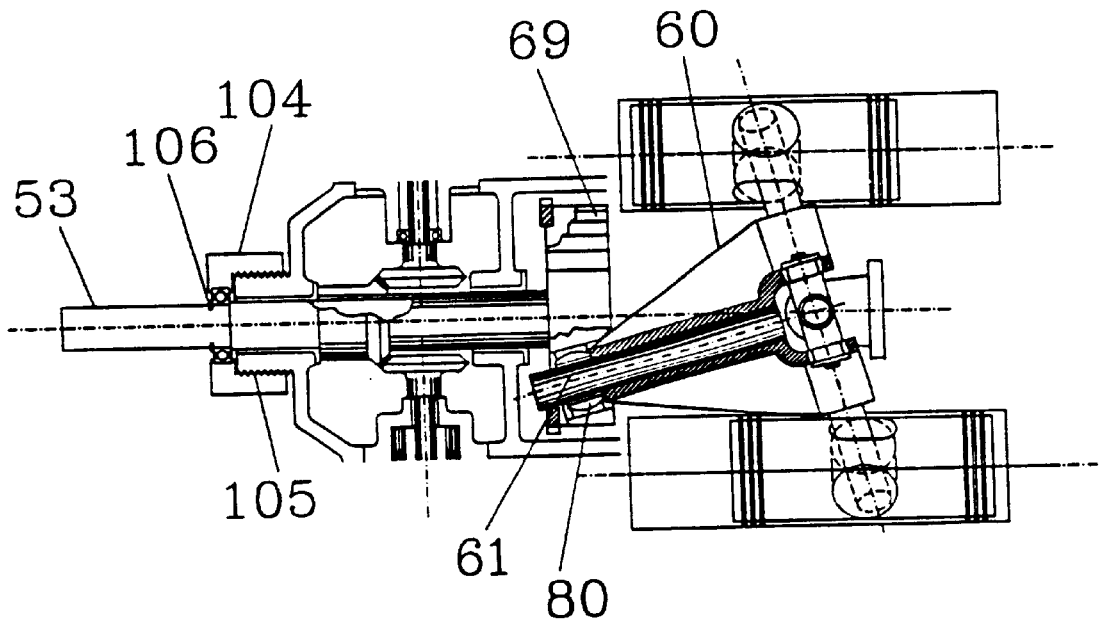
FIG. 12 is a partial top view of the engine of FIG. 7 showing the pistons, drive member and flywheel in a high compression position.
Figure 13:
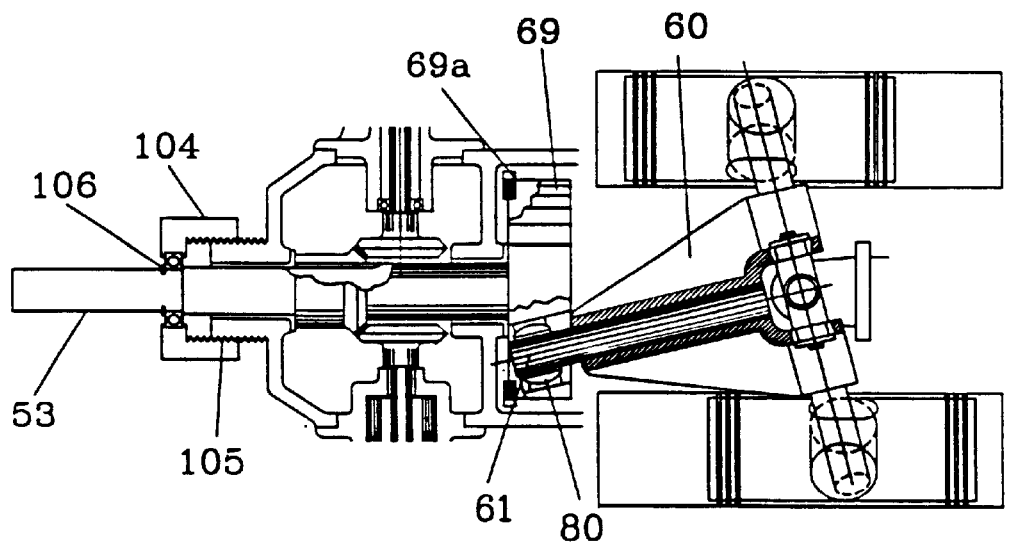
FIG. 13 is a partial top view of the engine in FIG. 7 showing the pistons, drive member and flywheel in a low compression position.

Referring to FIG. 13, the end of arm 61 is in a sleeve bearing ball bushing assembly 81. The stroke of the pistons is controlled by arm 61. Arm 61 forms an angle, for example about 15°, with shaft 53. By moving flywheel 69 on shaft 53 to the right or left, as viewed in FIG. 13, the angle of arm 61 can be changed, changing the stroke of the pistons, changing the compression ratio. The position of flywheel 69 is changed by turning nut 104 on threads 105. Nut 104 is keyed to shaft 53 by thrust bearing 106a held in place by ring 106b. In the position shown in FIG. 12, flywheel 69 has been moved to the right, extending the stroke of the pistons.

FIG. 12 shows flywheel moved to the right increasing the stroke of the pistons, providing a higher compression ratio. Nut 105 has been screwed to the right, moving shaft 53 and flywheel 69 to the right. Arm 61 extends further into bushing assembly 80 and out the back of flywheel 69.

FIG. 13 shows flywheel moved to the left reducing the stroke of the pistons, providing a lower compression ratio. Nut 105 has been screwed to the left, moving shaft 53 and flywheel 69 to the left. Arm 61 extends less into bushing assembly 80.

Figure 14:
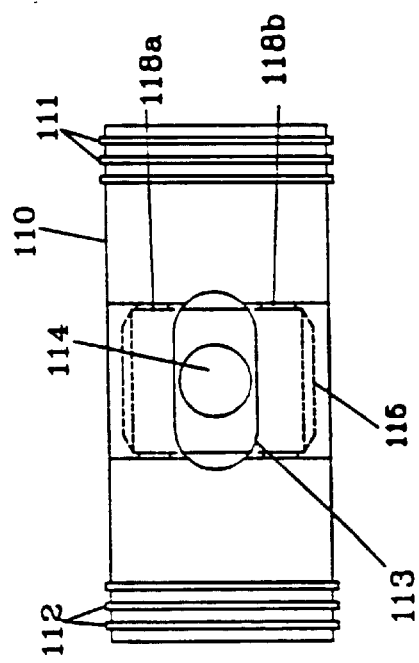
FIG. 14 is a top view of a piston.

The piston arms on the transition arm are inserted into sleeve bearings in a bushing in piston. FIG. 14 shows a double piston 110 having piston rings 111 on one end of the double piston and piston rings 112 on the other end of the double piston. A slot 113 is in the side of the piston. The location the sleeve bearing is shown at 114.

Figure 15:
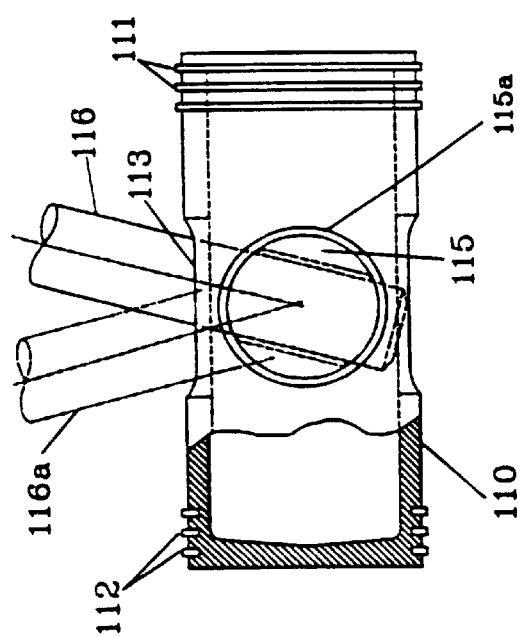
FIG. 15 is a side view of a piston showing the drive member in two positions.

FIG. 15 shows a piston arm 116 extending into piston 110 through slot 116 into sleeve bearing 117 in bushing 115. Piston arm 116 is shown in a second position at 116a. The two pistons arms 116 and 116a show the movement limits of piston arm 116 during operation of the engine.

Figure 16:
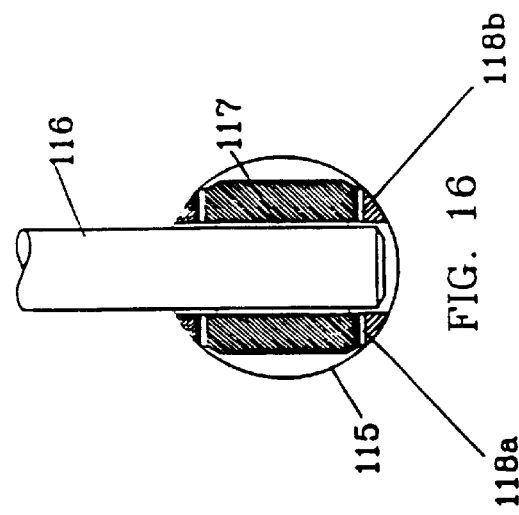
FIG. 16 shows the bearing interface of the drive member and the piston.

FIG. 16 shows piston arm 116 in sleeve bearing 117. Sleeve bearing 117 is in pivot pin 115. Piston arm 116 can freely rotate in sleeve bearing 117 and the assembly of piston arm 116, Sleeve bearing 117 and pivot pin 115 and sleeve bearings 118a and 118b rotate in piston 110, and piston arm 116 can moved axially with the axis of sleeve bearing 117 to allow for the linear motion of double ended piston 110, and the motion of a transition arm to which piston arm 116 is attached.

Figure 17:
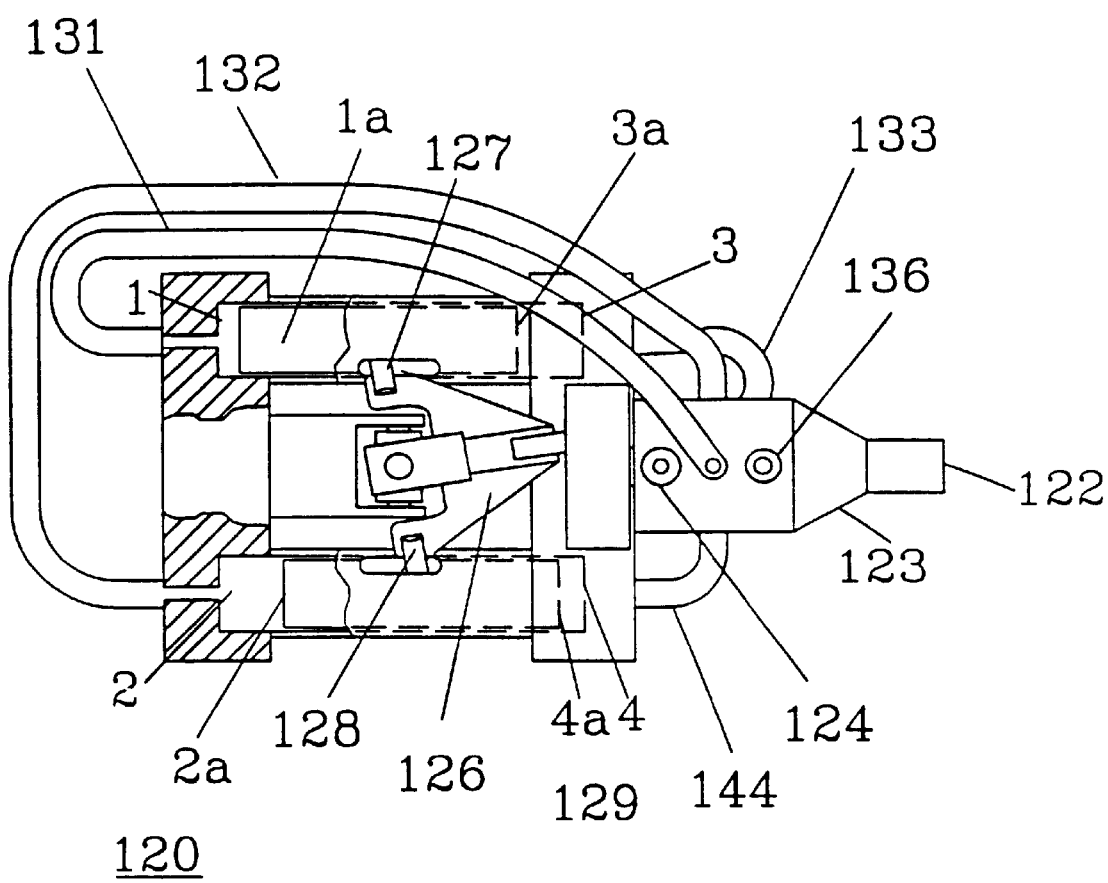
FIG. 17 is an air driven engine/pump embodiment.

FIG. 17 shows how the four cylinder engine 10 in FIG. 1 may be configured as an air motor using a four way rotary valve 123 on the output shaft 122. Each of cylinders 1, 2, 3 and 4 are connected by hoses 131. 132, 133, and 144, respectively, to rotary valve 123. Air inlet port 124 is used to supply air to run engine 120. Air is sequentially supplied to each of the pistons 1a, 2a, 3a and 4a, to move the pistons back and forth in the cylinders. Air is exhausted from the cylinders out exhaust port 136. Transition arm 126, attached to the pistons by connecting pins 127 and 128 are moved as described with references to FIGS. 1–6 to turn flywheel 129 and output shaft 22.

Figure 18:
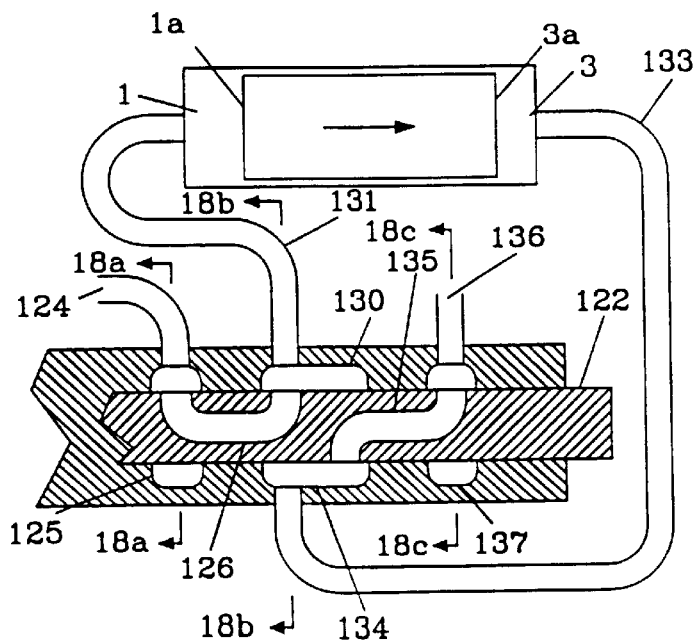
FIG. 18 illustrates the air valve in a first position.

FIG. 18 is a cross-sectional view of rotary valve 123 in the position when pressurized air or gas is being applied to cylinder 1 through inlet port 124, annular channel 125, channel 126, channel 130, and air hose 131. Rotary valve 123 is made up of a plurality of channels in housing 123 and output shaft 122. The pressurized air entering cylinder 1 causes piston 1a, 3a to move to the right (as viewed in FIG. 18). Exhaust air is forced out of cylinder 3 through line 133 into chamber 134, through passageway 135 and out exhaust outlet 136.

Figure 18A:
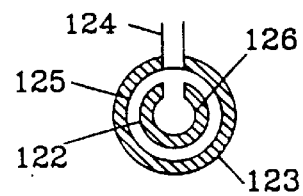
FIGS. 18a, 18b and 18c are cross-sectional view of three cross-sections of the air valve shown in FIG. 18.
Figure 18B:
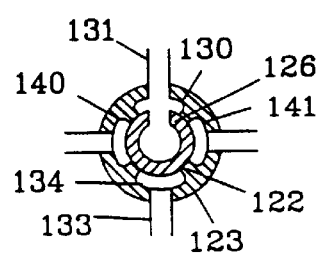
Figure 18C:
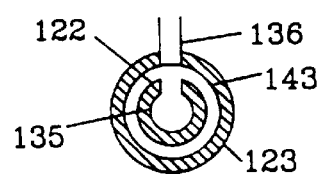

FIGS. 18a, 18b and 18c are cross-sectional view of valve 23 showing the air passages of the valves at three positions along valve 23 when positioned as shown in FIG. 18.

Figure 19:
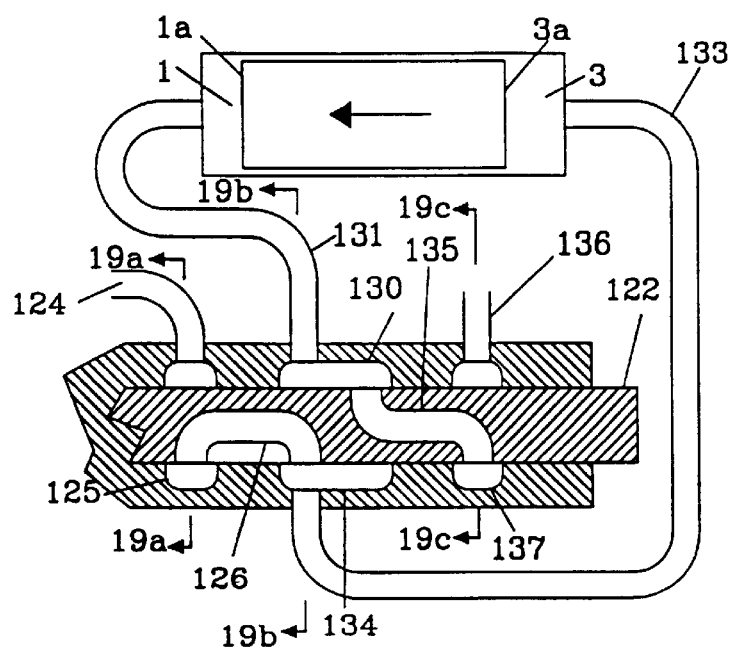
FIG. 19 illustrates the air valve in a second position.

FIG. 19 shows rotary valve 123 rotated 180° when pressurized air is applied to cylinder 3, reversing the direction of piston 1a,3a. Pressurized air is applied to inlet port 124, through annular chamber 125, passage way 126, chamber 134 and air line 133 to cylinder 3. This in turn causes air in cylinder 1 to be exhausted through line 131, chamber 130, line 135, annular chamber 137 and out exhaust port 136. Shaft 122 will have rotated 360° turning counter clockwise when piston 1a,3a complete it stroke to the left.

Only piston 1a,3a have been illustrated to show the operation of the air engine and valve 123 relative to the piston motion. The operation of piston 2a,4a is identical in function except that its 360° cycle starts at 90° shaft rotation and reverses at 270° and completes its cycle back at 90°. A power stroke occurs at every 90° of rotation.

Figure 19A:
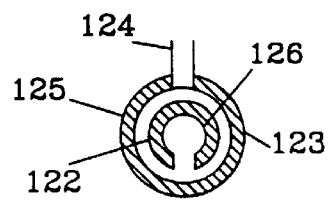
FIGS. 19a, 19b and 19c are cross-sectional view of three cross-sections for the air valve shown in FIG. 19.
Figure 19B:
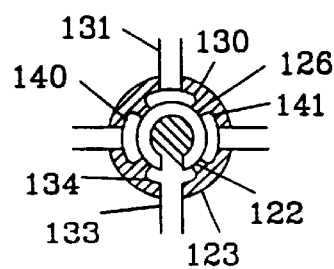
Figure 19C:
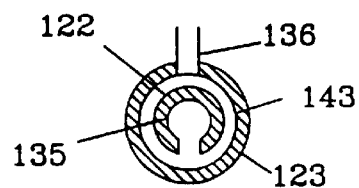

FIGS. 19a, 19b and 19c are cross-sectional views of valve 123 showing the air passages of the valves at three positions along valve 123 when positioned as shown in FIG. 19.

The principle of operation which operates the air engine of FIG. 17 can be reversed, and engine 120 of FIG. 17 can be used as an air or gas compressor or pump. By rotating engine 10 clockwise by applying rotary power to shaft 122, exhaust port 136 will draw in air into the cylinders and port 124 will supply air which may be used to drive, for example air tool, or be stored in an air tank.

Figure 20:
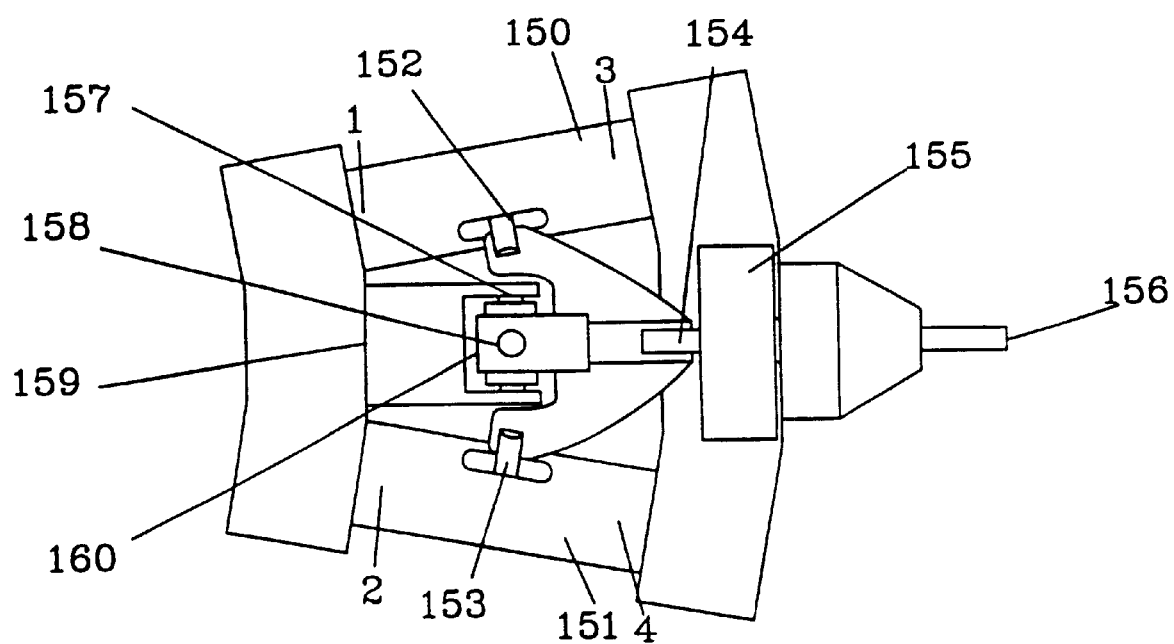
FIG. 20 shows an embodiment with slanted cylinders.

In the above embodiments, the cylinders have been illustrated as being parallel to each other. However, the cylinders need not be parallel. FIG. 20 shows an embodiment similar to the embodiment of FIG. 1–6, with cylinders 150 and 151 not parallel to each other. Universal joint 160 permits the piston arms 152 and 153 to be at an angle other than 90° to the drive arm 154. Even with the cylinders not parallel to each other the engines are functionally the same.

Figure 21:
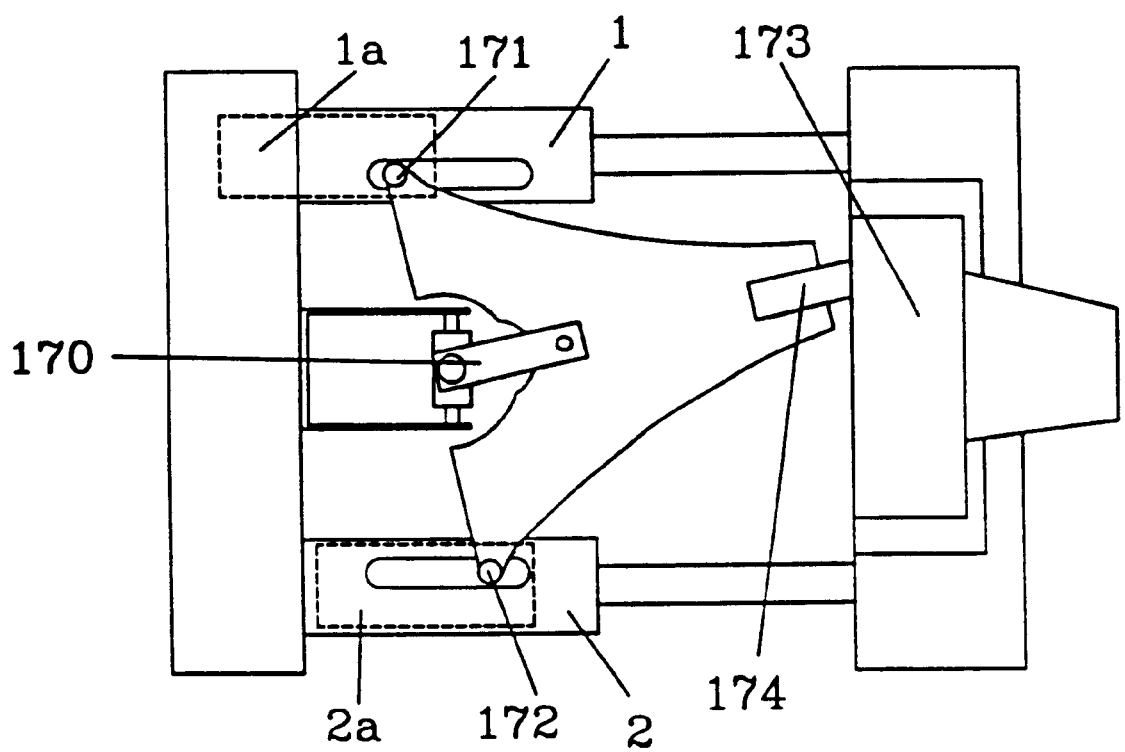
FIG. 21 shows an embodiment with single ended pistons.

Still another modification may be made to the engine 10 of FIGS. 1–6. This embodiment, pictorially shown in FIG. 21, may have single ended pistons. Piston 1a and 2a are connected to universal joint 170 by drive arms 171 and 172, and to flywheel 173 by drive arm 174. The basic difference is the number of strokes of pistons 1a and 2a to rotate flywheel 173 360°.

Figure 22:
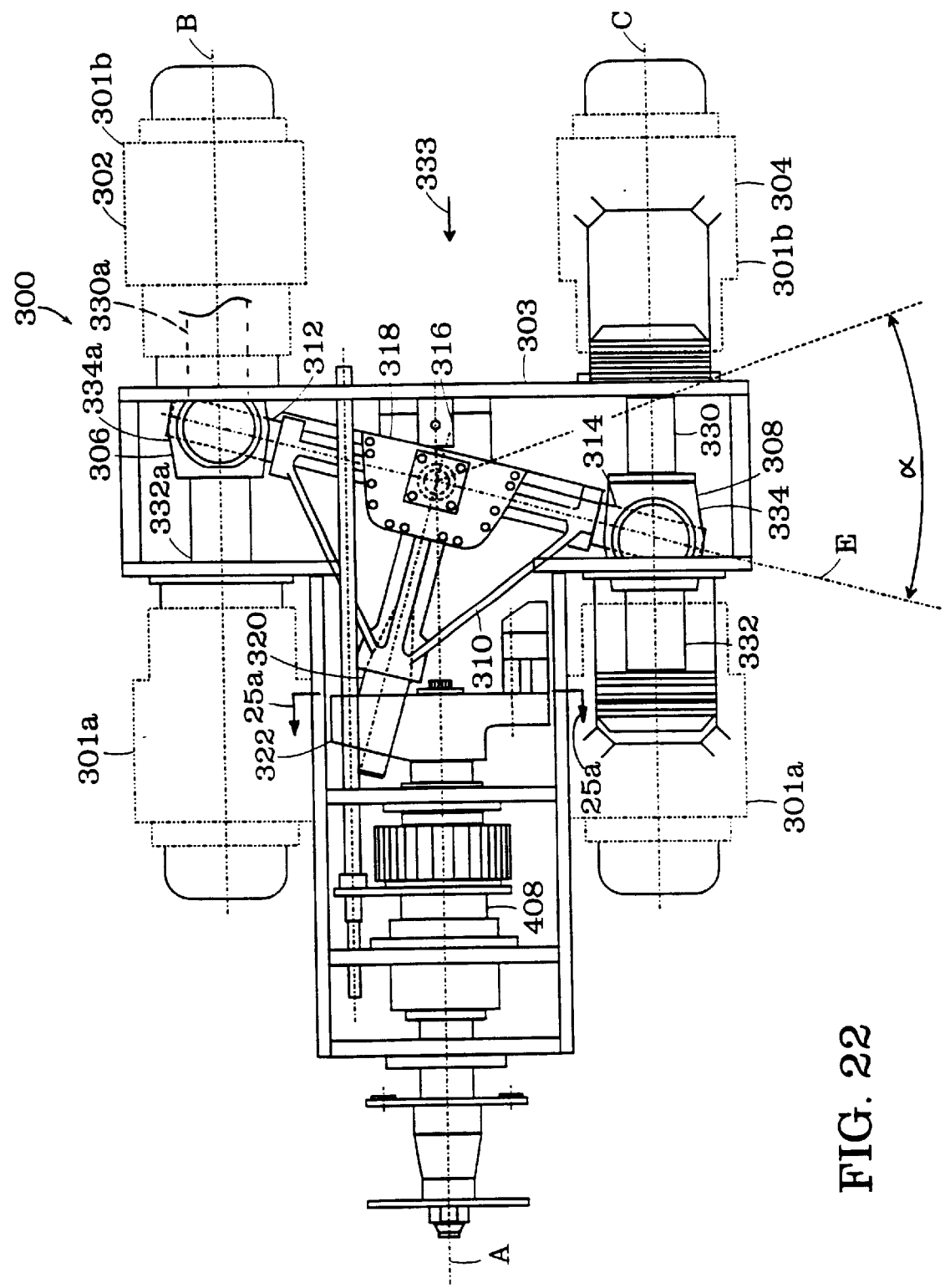
FIG. 22 is a top view of a two cylinder, double ended piston assembly.

Referring to FIG. 22, a two cylinder piston assembly 300 includes cylinders 302, 304, each housing a variable stroke, double ended piston 306, 308, respectively. Piston assembly 300 provides the same number of power strokes per revolution as a conventional four cylinder engine. Each double ended piston 306, 308 is connected to a transition arm 310 by a drive pin 312, 314, respectively. Transition arm 310 is mounted to a support 316 by, e.g., a universal joint 318 (U-joint), constant velocity joint, or spherical bearing. A drive arm 320 extending from transition arm 310 is connected to a rotatable member, e.g., flywheel 322.

Figure 28A:
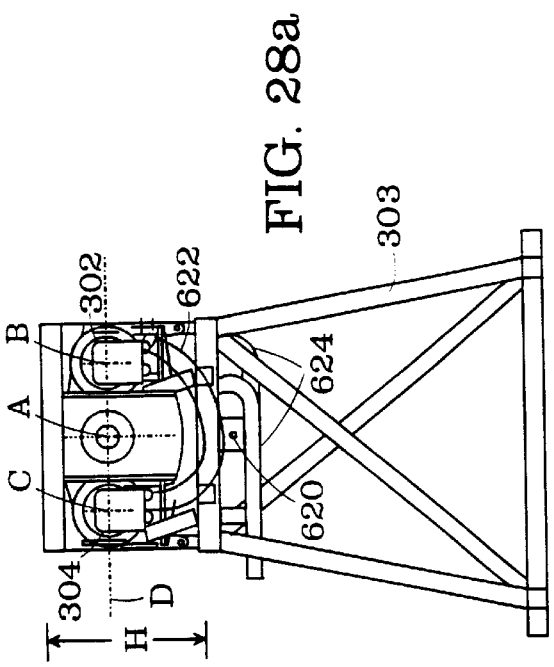
FIGS. 28–28b are top, rear, and side views, respectively, of the piston assembly of FIG. 22.
FIG. 28c is a top view of an auxiliary shaft of the piston assembly of FIG. 22.

Transition arm 310 transmits linear motion of pistons 306, 308 to rotary motion of flywheel 322. The axis, A, of flywheel 322 is parallel to the axes, B and C, of pistons 306, 308 (though axis, A, could be off-axis as shown in FIG. 20) to form an axial or barrel type engine, pump, or compressor. U-joint 318 is centered on axis, A. As shown in FIG. 28a, pistons 306, 308 are 180° apart with axes A, B and C lying along a common plane, D, to form a flat piston assembly.

Referring to FIGS. 22 and 23, cylinders 302, 304 each include left and right cylinder halves 301a, 301b mounted to the assembly case structure 303. Double ended pistons 306, 308 each include two pistons 330 and 332, 330a and 332a, respectively, joined by a central joint 334, 334a, respectively. The pistons are shown having equal length, though other lengths are contemplated. For example, joint 334 can be off-center such that piston 330 is longer than piston 332. As the pistons are fired in sequence 330a, 332, 330, 332a, from the position shown in FIG. 22, flywheel 322 is rotated in a clockwise direction, as viewed in the direction of arrow 333. Piston assembly 300 is a four stroke cycle engine, i.e., each piston fires once in two revolutions of flywheel 322.

As the pistons move back and forth, drive pins 312, 314 must be free to rotate about their common axis, E, (arrow 305), slide along axis, E, (arrow 307) as the radial distance to the center line, B, of the piston changes with the angle of swing, α, of transition arm 310 (approximately ±15° swing), and pivot about centers, F, (arrow 309). Joint 334 is constructed to provide this freedom of motion.

Joint 334 defines a slot 340 (FIG. 23a) for receiving drive pin 312, and a hole 336 perpendicular to slot 340 housing a sleeve bearing 338. A cylinder 341 is positioned within sleeve bearing 338 for rotation within the sleeve bearing. Sleeve bearing 338 defines a side slot 342 shaped like slot 340 and aligned with slot 340. Cylinder 341 defines a through hole 344. Drive pin 312 is received within slot 342 and hole 344. An additional sleeve bearing 346 is located in through hole 344 of cylinder 341. The combination of slots 340 and 342 and sleeve bearing 338 permit drive pin 312 to move along arrow 309. Sleeve bearing 346 permits drive pin 312 to rotate about its axis, E, and slide along its axis, E.

If the two cylinders of the piston assembly are configured other than 180° apart, or more than two cylinders are employed, movement of cylinder 341 in sleeve bearing 338 along the direction of arrow 350 allows for the additional freedom of motion required to prevent binding of the pistons as they undergo a figure 8 motion, discussed below. Slot 340 must also be sized to provide enough clearance to allow the figure 8 motion of the pin.

Figure 35:
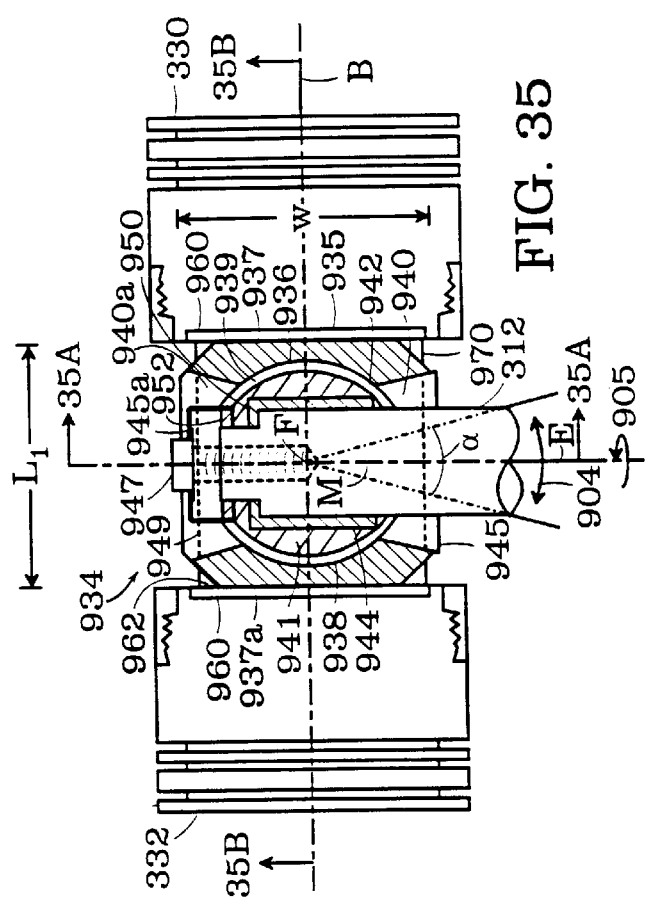
FIG. 35 is a partial, cross-sectional top view of an alternative embodiment of a double-ended piston joint.
Figure 35B:
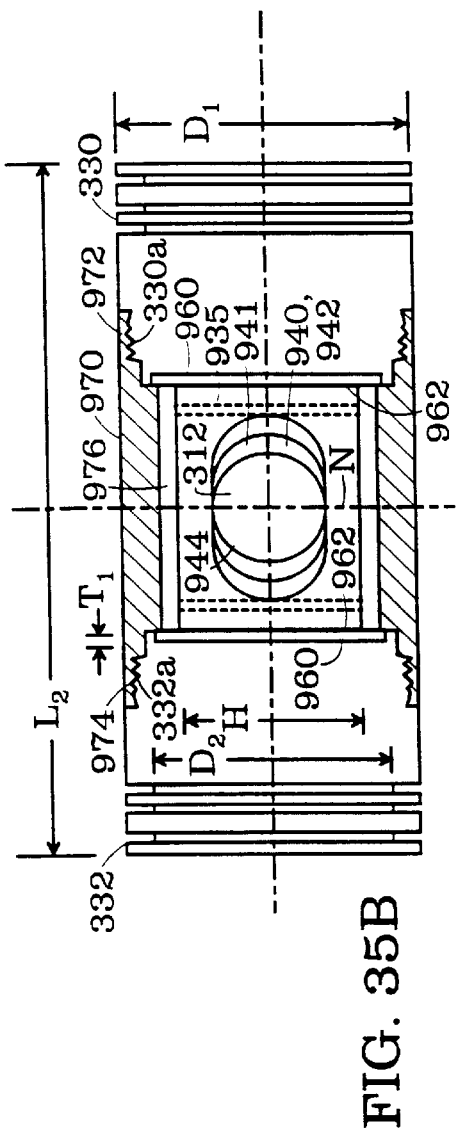
FIG. 35A is an end view and FIG. 35B is a side view of the double-ended piston joint, taken along lines 35A, 35A and 35B, 35B, respectively, of FIG. 35.
Figure 35A:
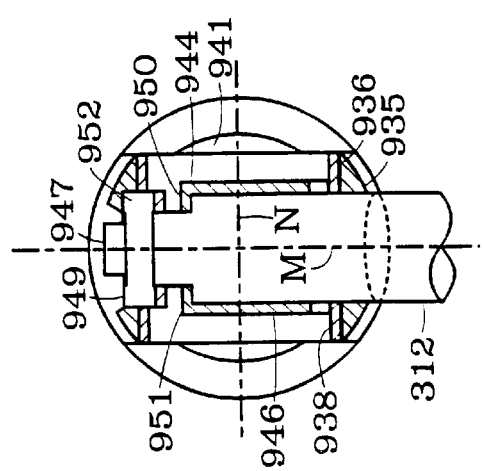

Referring to FIGS. 35–35B, an alternative embodiment of a central joint 934 for joining pistons 330 and 332 is configured to produce zero side load on pistons 330 and 332. Joint 934 permits the four degrees of freedom necessary to prevent binding of drive pin 312 as the pistons move back and forth, i.e., rotation about axis, E, (arrow 905), pivoting about center, F, (arrow 904), and sliding movement along orthogonal axes, M (up and down in the plane of the paper in FIG. 35) and N (in and out of the plane of the paper in FIG. 35), while the load transmitted between joint 934 and pistons 330, 332 only produces a force vector which is parallel to piston axis, B (which is orthogonal to axes M and N).

Sliding movement along axis, M, accommodates the change in the radial distance of transition arm 310 to the center line, B, of the piston with the angle of swing, α, of transition arm 310. Sliding movement along axis, N, allows for the additional freedom of motion required to prevent binding of the pistons as they undergo the figure eight motion, discussed below. Joint 934 defines two opposed flat faces 937, 937a which slide in the directions of axes M and N relative to pistons 330, 332. Faces 937, 937a define parallel planes which remain perpendicular to piston axis, B, during the back and forth movement of the pistons.

Joint 934 includes an outer slider member 935 which defines faces 937, 937a for receiving the driving force from pistons 330, 332. Slider member 935 defines a slot 940 in a third face 945 of the slider for receiving drive pin 312, and a slot 940a in a fourth face 945a. Slider member 935 has an inner wall 936 defining a hole 939 perpendicular to slot 940 and housing a slider sleeve bearing 938. A cross shaft 941 is positioned within sleeve bearing 938 for rotation within the sleeve bearing in the direction of arrow 904. Sleeve bearing 938 defines a side slot 942 shaped like slot 940 and aligned with slot 940. Cross shaft 941 defines a through hole 944. Drive pin 312 is received within slot 942 and hole 944. A sleeve bearing 946 is located in through hole 944 of cross shaft 941.

The combination of slots 940 and 942 and sleeve bearing 938 permit drive pin 312 to move in the direction of arrow 904. Positioned within slot 940a is a cap screw 947 and washer 949 which attach to drive pin 312 retaining drive pin 312 against a step 951 defined by cross shaft 941 while permitting drive pin 312 to rotate about its axis, E, and preventing drive pin 312 from sliding along axis, E. As discussed above, the two addition freedoms of motion are provided by sliding of slider faces 937, 937a relative to pistons 330, 332 along axis, M and N. A plate 960 is placed between each of face 937 and piston 330 and face 937a and piston 332. Each plate 960 is formed of a low friction bearing material with a bearing surface 962 in contact with faces 937, 937a, respectively. Faces 937, 937a are polished.

Figure 36:
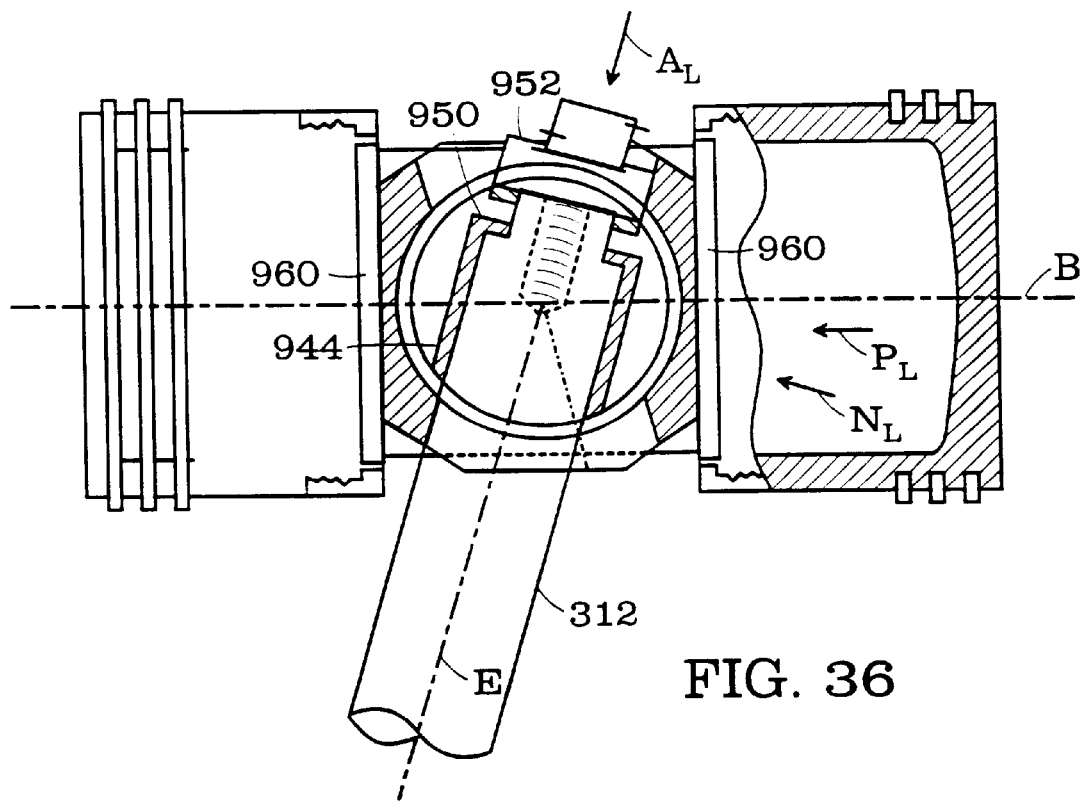
FIG. 36 is a partial, cross-sectional top view of the double-ended piston joint of FIG. 35 shown in a rotated position.

As shown in FIG. 36, the load, PL, applied to joint 934 by piston 330 in the direction of piston axis, B, is resolved into two perpendicular loads acting on pin 312: axial load, $A_L$, along the axis, E, of drive pin 312, and normal load, $N_L$, perpendicular to drive pin axis, E. The axial load is applied to thrust bearings 950, 952, and the normal load is applied to sleeve bearing 946. The net direction of the forces transmitted between pistons 330, 332 and joint 934 remains along piston axis, B, preventing side loads being applied to pistons 330, 332. This is advantageous because side loads on pistons 330, 332 can cause the pistons to contact the cylinder wall creating frictional losses proportional to the side load values.

Pistons 330, 332 are mounted to joint 934 by a center piece connector 970. Center piece 970 includes threaded ends 972, 974 for receiving threaded ends 330a and 332a of the pistons, respectively. Center piece 970 defines a cavity 975 for receiving joint 934. A gap 976 is provided between joint 934 and center piece 970 to permit motion along axis, N.

For an engine capable of producing, e.g., about 100 horsepower, joint 934 has a width, W, of, e.g., about 3 5/16 inches, a length, $L_1$, of, e.g., 3 5/16 inches, and a height, H, of, e.g., about 3½ inches. The joint and piston ends together have an overall length, $L_2$, of, e.g., about 9 5/16 inches, and a diameter, $D_2$, of, e.g., about 4 inches. Plates 960 have a diameter, $D_2$, of, e.g., about 3¼ inch, and a thickness, T, of, e.g., about ⅛ inch. Plates 960 are press fit into the pistons. Plates 960 are preferably bronze, and slider 935 is preferably steel or aluminum with a steel surface defining faces 937, 937a.

Figure 37:
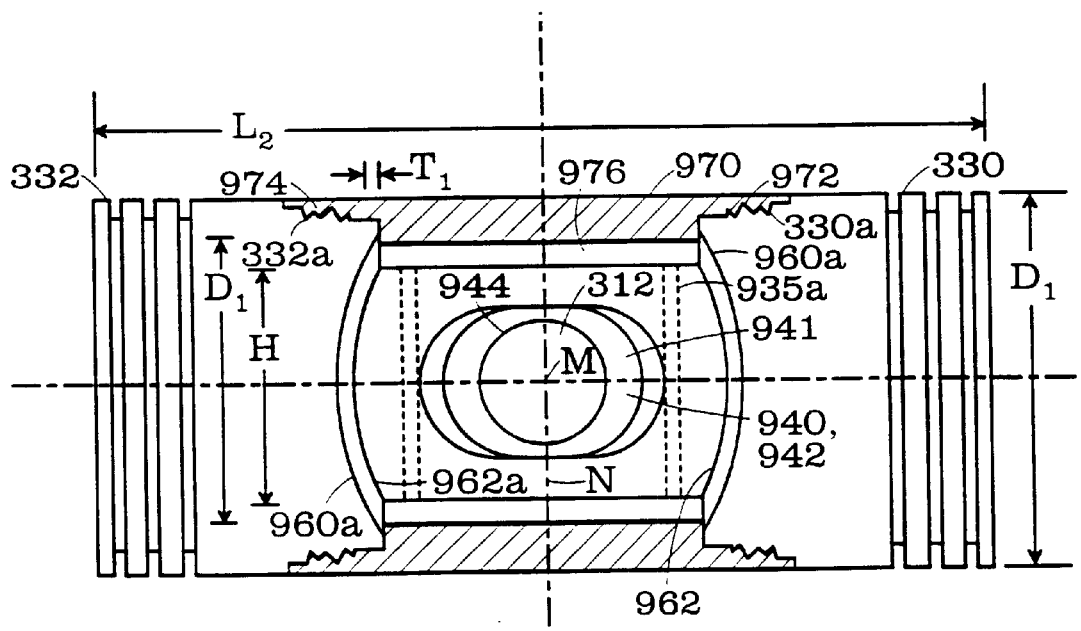
FIG. 37 is a side view of an alternative embodiment of the joint of FIG. 35.

Joint 934 need not be used to join two pistons. One of pistons 330, 332 can be replaced by a rod guided in a bushing.

Where figure eight motion is not required or is allowed by motion of drive pin 312 within cross shaft 941, joint 934 need not slide in the direction of axis, N. Referring to FIG. 37, slider member 935a and plates 960a have curved surfaces permitting slider member 935a to slide in the direction of axis, M, (in and out of the paper in FIG. 37) while preventing slider member 935a to move along axis, N.

Referring to FIGS. 24 and 24a, U-joint 318 defines a central pivot 352 (drive pin axis, E, passes through center 352), and includes a vertical pin 354 and a horizontal pin 356. Transition arm 310 is capable of pivoting about pin 354 along arrow 358, and about pin 356 along arrow 360.

Figure 25:
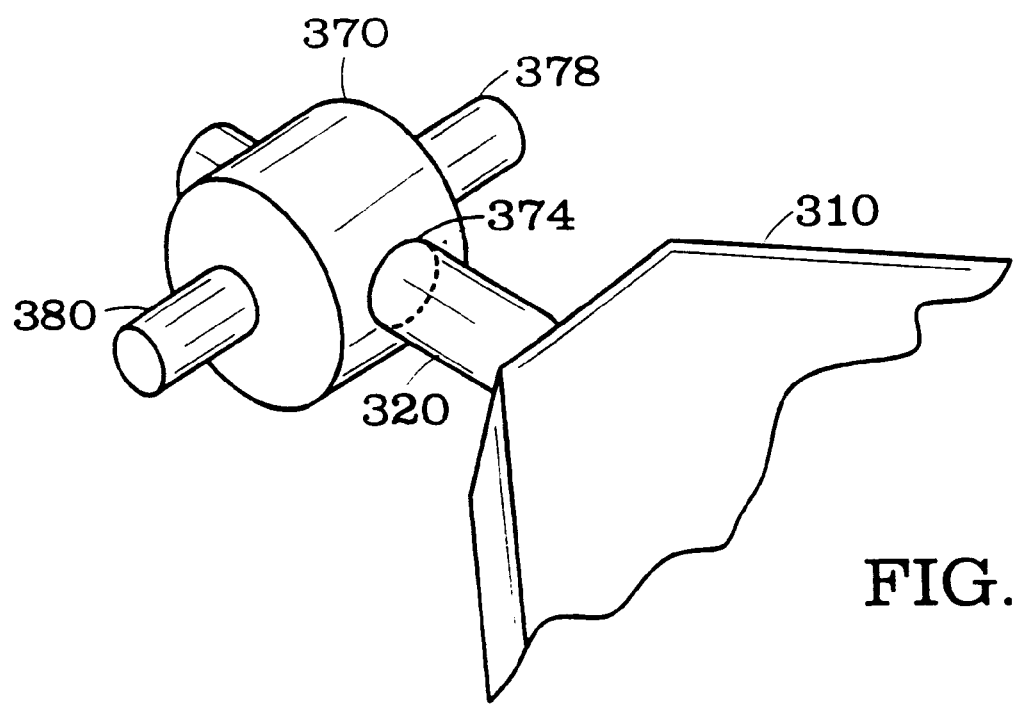
FIG. 25 is a perspective view of a drive arm connected to the transition arm of the piston assembly of FIG. 22.
Figure 25B:
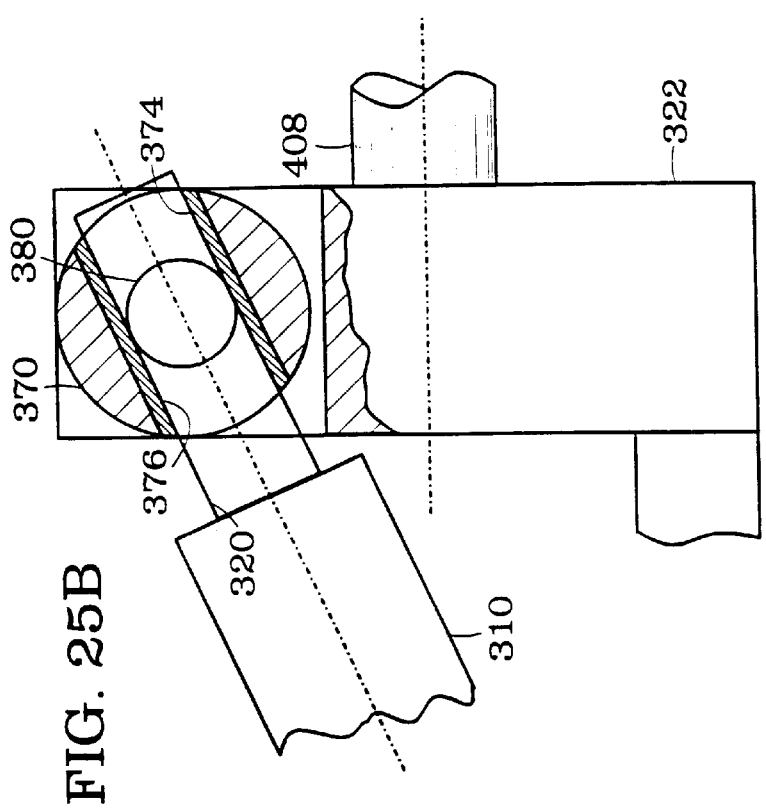
Figure 25A:
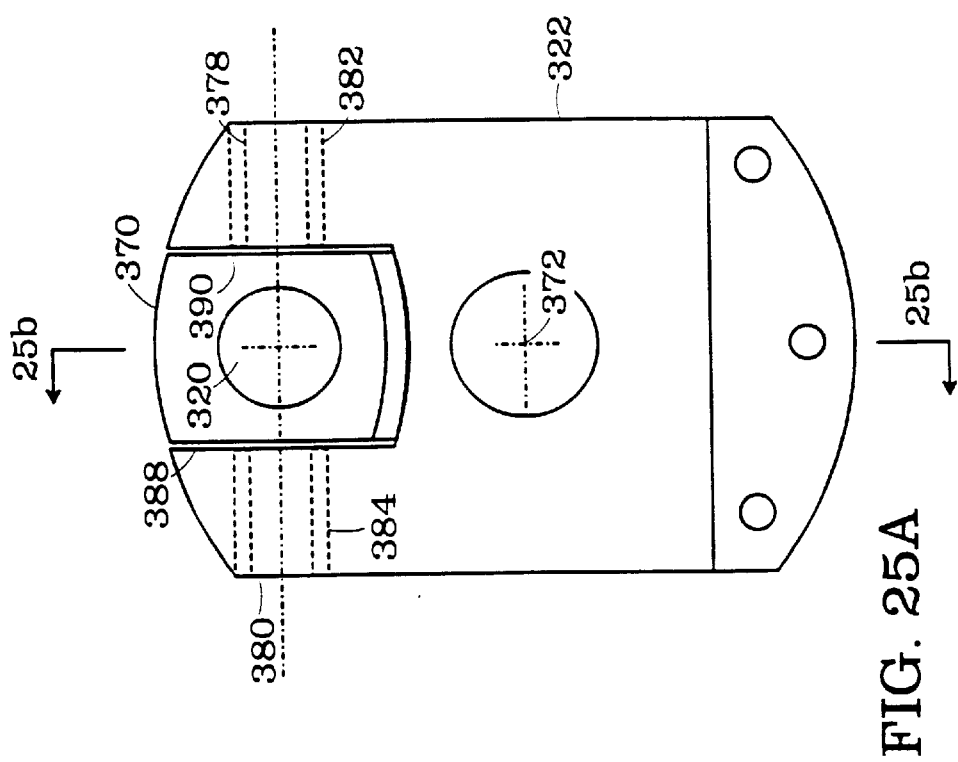
FIG. 25a is an end view of a rotatable member of the piston assembly of FIG. 22, taken along lines 25a, 25a of FIG. 22, and showing the connection of the drive arm to the rotatable member.

Referring to FIGS. 25, 25a and 25b, as an alternative to a spherical bearing, to couple transition arm 310 to flywheel 322, drive arm 320 is received within a cylindrical pivot pin 370 mounted to the flywheel offset radially from the center 372 of the flywheel by an amount, e.g., 2.125 inches, required to produce the desired swing angle, α (FIG. 22), in the transition arm.

Pivot pin 370 has a through hole 374 for receiving drive arm 320. There is a sleeve bearing 376 in hole 374 to provide a bearing surface for drive arm 320. Pivot pin 370 has cylindrical extensions 378, 380 positioned within sleeve bearings 382, 384, respectively. As the flywheel is moved axially along drive arm 320 to vary the swing angle, α, and thus the compression ratio of the assembly, as described further below, pivot pin 370 rotates within sleeve bearings 382, 384 to remain aligned with drive arm 320. Torsional forces are transmitted through thrust bearings 388, 390, with one or the other of the thrust bearings carrying the load depending on the direction of the rotation of the flywheel along arrow 386.

Figure 26:
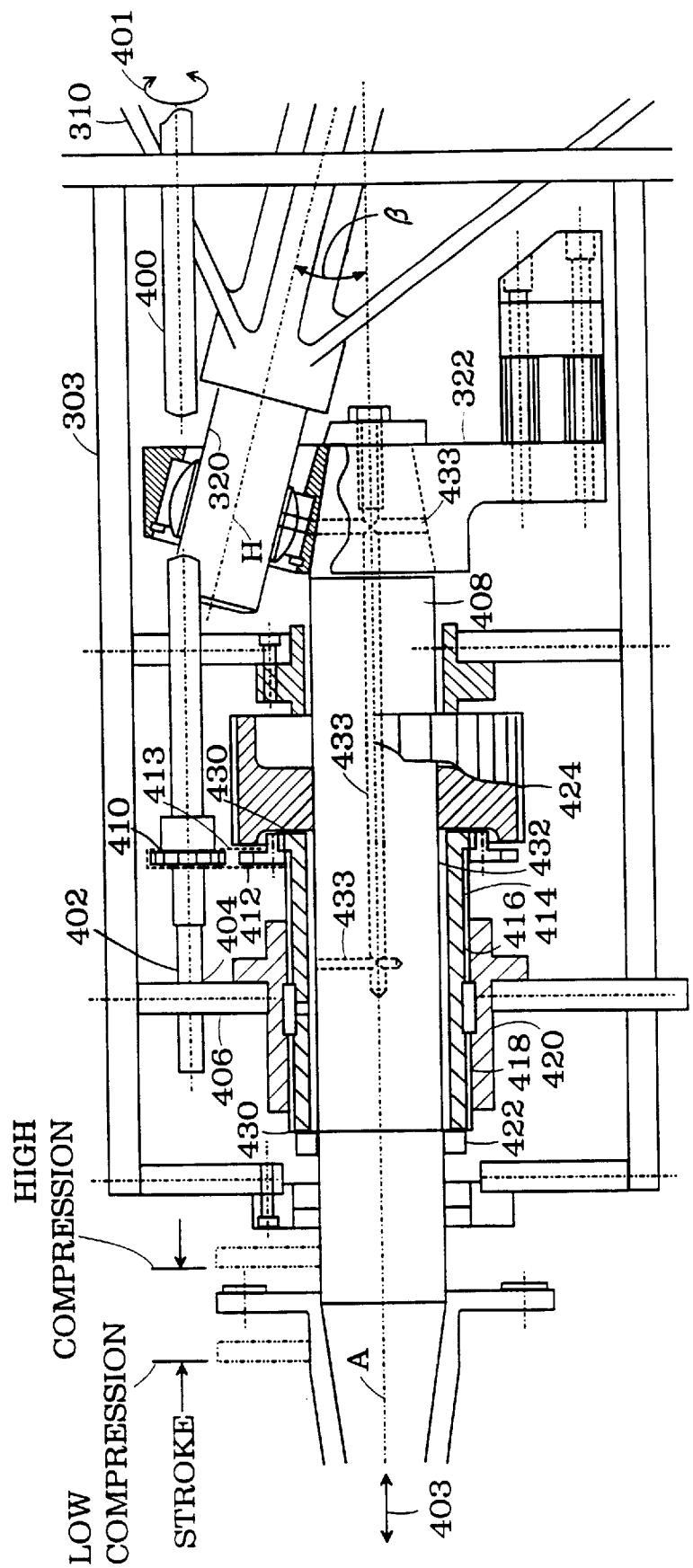
FIG. 26 is a cross-sectional, top view of the piston assembly of FIG. 22.

Referring to FIG. 26, to vary the compression and displacement of piston assembly 300, the axial position of flywheel 322 along axis, A, is varied by rotating a shaft 400. A sprocket 410 is mounted to shaft 400 to rotate with shaft 400. A second sprocket 412 is connected to sprocket 410 by a roller chain 413. Sprocket 412 is mounted to a threaded rotating barrel 414. Threads 416 of barrel 414 contact threads 418 of a stationary outer barrel 420.

Rotation of shaft 400, arrow 401, and thus sprockets 410 and 412, causes rotation of barrel 414. Because outer barrel 420 is fixed, the rotation of barrel 414 causes barrel 414 to move linearly along axis, A, arrow 403. Barrel 414 is positioned between a collar 422 and a gear 424, both fixed to a main drive shaft 408. Drive shaft 408 is in turn fixed to flywheel 322. Thus, movement of barrel 414 along axis, A, is translated to linear movement of flywheel 322 along axis, A. This results in flywheel 322 sliding along axis, H, of drive arm 320 of transition arm 310, changing angle, β, and thus the stroke of the pistons. Thrust bearings 430 are located at both ends of barrel 414, and a sleeve bearing 432 is located between barrel 414 and shaft 408.

To maintain the alignment of sprockets 410 and 412, shaft 400 is threaded at region 402 and is received within a threaded hole 404 of a cross bar 406 of assembly case structure 303. The ratio of the number of teeth of sprocket 412 to sprocket 410 is, e.g., 4:1. Therefore, shaft 400 must turn four revolutions for a single revolution of barrel 414. To maintain alignment, threaded region 402 must have four times the threads per inch of barrel threads 416, e.g., threaded region 402 has thirty-two threads per inch, and barrel threads 416 have eight threads per inch.

As the flywheel moves to the right, as viewed in FIG. 26, the stroke of the pistons, and thus the compression ratio, is increased. Moving the flywheel to the left decreases the stroke and the compression ratio. A further benefit of the change in stroke is a change in the displacement of each piston and therefore the displacement of the engine. The horsepower of an internal combustion engine closely relates to the displacement of the engine. For example, in the two cylinder, flat engine, the displacement increases by about 20% when the compression ratio is raised from 6:1 to 12:1. This produces approximately 20% more horsepower due alone to the increase in displacement. The increase in compression ratio also increases the horsepower at the rate of about 5% per point or approximately 25% in horsepower. If the horsepower were maintained constant and the compression ratio increased from 6:1 to 12:1, there would be a reduction in fuel consumption of approximately 25%.

The flywheel has sufficient strength to withstand the large centrifugal forces seen when assembly 300 is functioning as an engine. The flywheel position, and thus the compression ratio of the piston assembly, can be varied while the piston assembly is running.

Piston assembly 300 includes a pressure lubrication system. The pressure is provided by an engine driven positive displacement pump (not shown) having a pressure relief valve to prevent overpressures. Bearings 430 and 432 of drive shaft 408 and the interface of drive arm 320 with flywheel 322 are lubricated via ports 433 (FIG. 26).

Figure 27A:
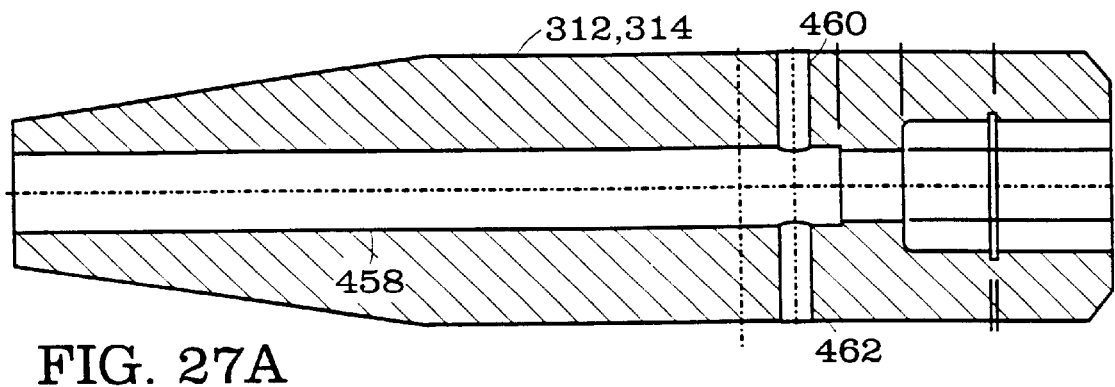
FIG. 27a is a cross-sectional view of a drive pin of the piston assembly of FIG. 22.

Referring to FIG. 27, to lubricate U-joint 318, piston pin joints 306, 308, and the cylinder walls, oil under pressure from the oil pump is ported through the fixed U-joint bracket to the top and bottom ends of the vertical pivot pin 354. Oil ports 450, 452 lead from the vertical pin to openings 454, 456, respectively, in the transition arm. As shown in FIG. 27A, pins 312, 314 each define a through bore 458. Each through bore 458 is in fluid communication with a respective one of openings 454, 456. As shown in FIG. 23, holes 460, 462 in each pin connect through slots 461 and ports 463 through sleeve bearing 338 to a chamber 465 in each piston. Several oil lines 464 feed out from these chambers and are connected to the skirt 466 of each piston to provide lubrication to the cylinders walls and the piston rings 467. Also leading from chamber 465 is an orifice to squirt oil directly onto the inside of the top of each piston for cooling.

Figure 28:
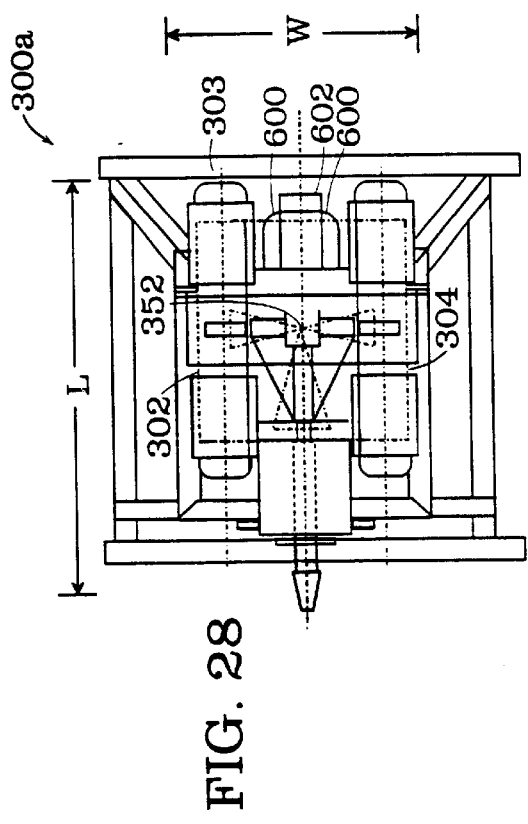
Figure 28B:
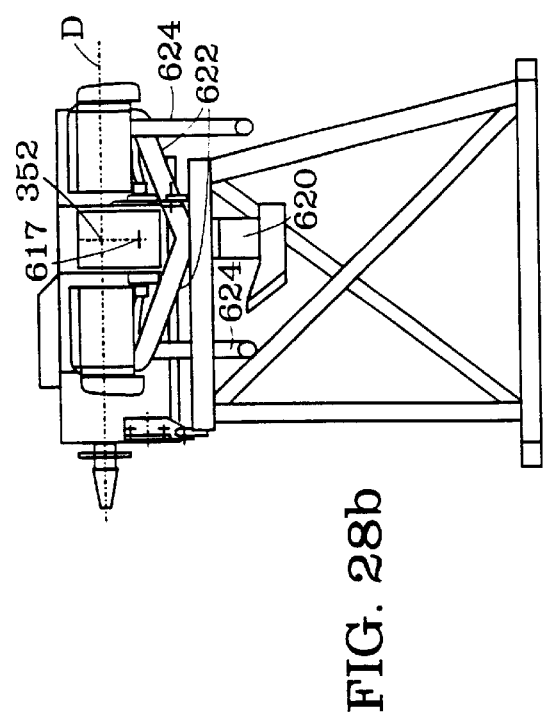
Figure 28C:
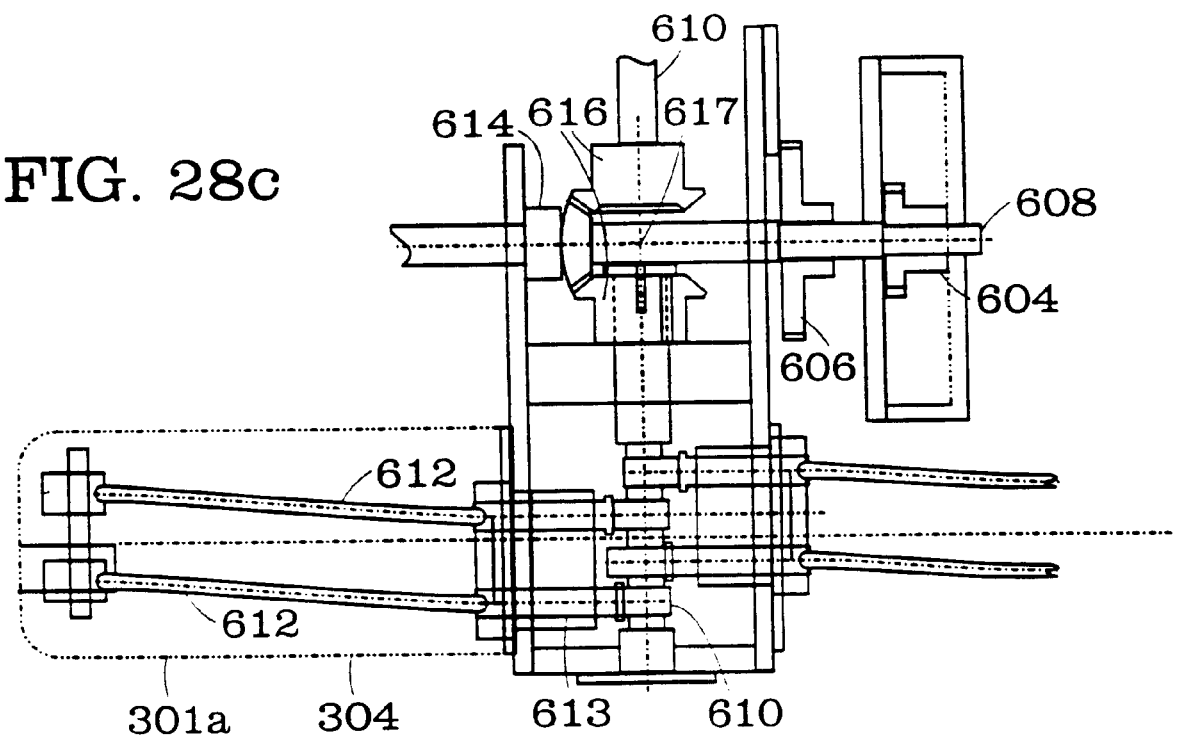

Referring to FIGS. 28–28c, in which assembly 300 is shown configured for use as an aircraft engine 300a, the engine ignition includes two magnetos 600 to fire the piston spark plugs (not shown). Magnetos 600 and a starter 602 are driven by drive gears 604 and 606 (FIG. 28c), respectively, located on a lower shaft 608 mounted parallel and below the main drive shaft 408. Shaft 608 extends the full length of the engine and is driven by gear 424 (FIG. 26) of drive shaft 408 and is geared with a one to one ratio to drive shaft 408. The gearing for the magnetos reduces their speed to half the speed of shaft 608. Starter 602 is geared to provide sufficient torque to start the engine.

Camshafts 610 operate piston push rods 612 through lifters 613. Camshafts 610 are geared down 2 to 1 through bevel gears 614, 616 also driven from shaft 608. Center 617 of gears 614, 616 is preferably aligned with U-joint center 352 such that the camshafts are centered in the piston cylinders, though other configurations are contemplated. A single carburetor 620 is located under the center of the engine with four induction pipes 622 routed to each of the four cylinder intake valves (not shown). The cylinder exhaust valves (not shown) exhaust into two manifolds 624.

Engine 300a has a length, L, e.g., of about forty inches, a width, W, e.g., of about twenty-one inches, and a height, H, e.g., of about twenty inches, (excluding support 303).

Referring to FIGS. 29 and 29a, a variable compression compressor or pump having zero stroke capability is illustrated. Here, flywheel 322 is replaced by a rotating assembly 500. Assembly 500 includes a hollow shaft 502 and a pivot arm 504 pivotally connected by a pin 506 to a hub 508 of shaft 502. Hub 508 defines a hole 510 and pivot arm 504 defines a hole 512 for receiving pin 506. A control rod 514 is located within shaft 502. Control rod 514 includes a link 516 pivotally connected to the remainder of rod 514 by a pin 518. Rod 514 defines a hole 511 and link 516 defines a hole 513 for receiving pin 518. Control rod 514 is supported for movement along its axis, Z, by two sleeve bearings 520. Link 516 and pivot arm 514 are connected by a pin 522. Link 516 defines a hole 523 and pivot arm 514 defines a hole 524 for receiving pin 522.

Cylindrical pivot pin 370 of FIG. 25 which receives drive arm 320 is positioned within pivot arm 504. Pivot arm 504 defines holes 526 for receiving cylindrical extensions 378, 380. Shaft 502 is supported for rotation by bearings 530, e.g., ball, sleeve, or roller bearings. A drive, e.g, pulley 532 or gears, mounted to shaft 502 drives the compressor or pump.

In operation, to set the desired stroke of the pistons, control rod 514 is moved along its axis, M, in the direction of arrow 515, causing pivot arm 504 to pivot about pin 506, along arrow 517, such that pivot pin 370 axis, N, is moved out of alignment with axis, M, (as shown in dashed lines) as pivot arm 504 slides along the axis, H, (FIG. 26) of the transition arm drive arm 320. When zero stroke of the pistons is desired, axes M and N are aligned such that rotation of shaft 514 does not cause movement of the pistons. This configuration works for both double ended and single sided pistons.

The ability to vary the piston stroke permits shaft 514 to be run at a single speed by drive 532 while the output of the pump or compressor can be continually varied as needed. When no output is needed, pivot arm 504 simply spins around drive arm 320 of transition arm 310 with zero swing of the drive arm. When output is needed, shaft 514 is already running at full speed so that when pivot arm 504 is pulled off-axis by control rod 514, an immediate stroke is produced with no lag coming up to speed. There are therefore much lower stress loads on the drive system as there are no start/stop actions. The ability to quickly reduce the stroke to zero provides protection from damage especially in liquid pumping when a downstream blockage occurs.

Figure 33:
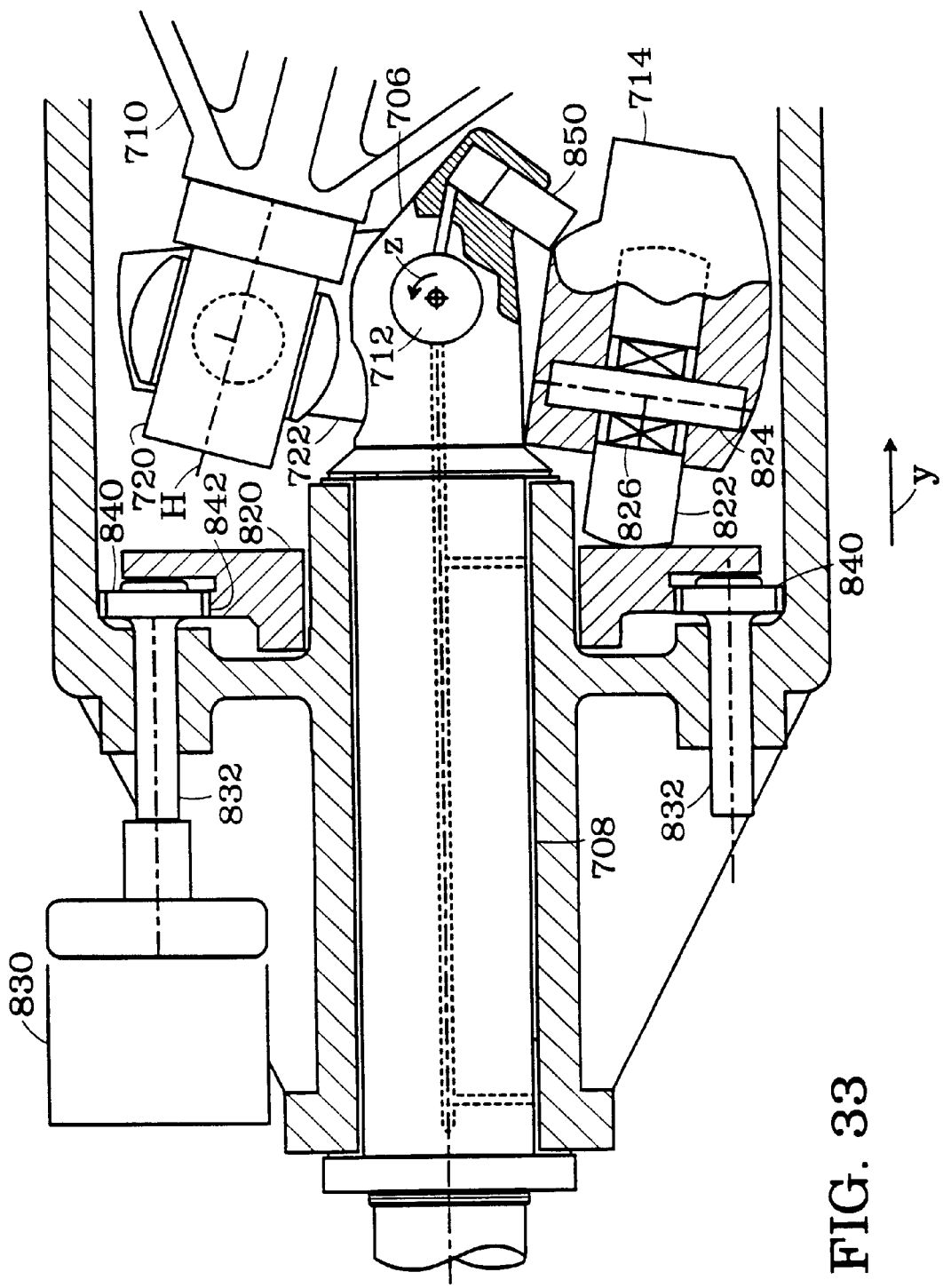
FIG. 33 is a cross-sectional top view of an alternative embodiment of a variable stroke assembly shown in a maximum stroke position.

An alternative method of varying the compression and displacement of the pistons is shown in FIG. 33. The mechanism provides for varying of the position of a counterweight attached to the flywheel to maintain system balance as the stroke of the pistons is varied.

A flywheel 722 is pivotally mounted to an extension 706 of a main drive shaft 708 by a pin 712. By pivoting flywheel 722 in the direction of arrow, Z, flywheel 722 slides along axis, H, of a drive arm 720 of transition arm 710, changing angle, $\beta$ (FIG. 26), and thus the stroke of the pistons. Pivoting flywheel 722 also causes a counterweight 714 to move closer to or further from axis, A, thus maintaining near rotational balance.

Figure 34:
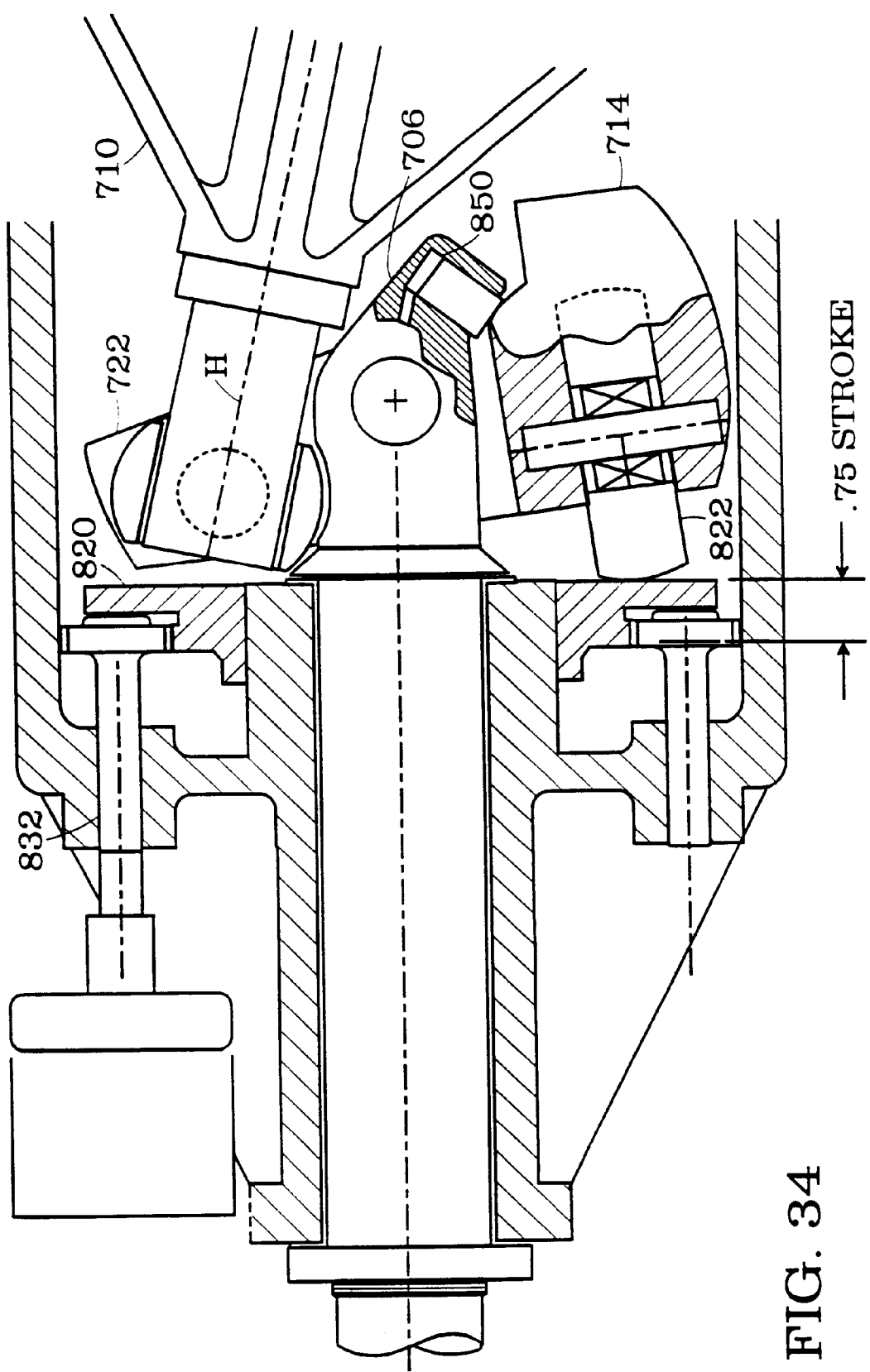
FIG. 34 is a cross-sectional top view of the embodiment of FIG. 33 shown in a minimum stroke position.

To pivot flywheel 722, an axially and rotationally movable pressure plate 820 is provided. Pressure plate 820 is in contact with a roller 822 rotationally mounted to counterweight 714 through a pin 824 and bearing 826. From the position shown in FIG. 33, a servo motor or hand knob 830 turns a screw 832 which advances to move pressure plate 820 in the direction of arrow, Y. This motion of pressure plate 820 causes flywheel 722 to pivot in the direction of arrow, Z, as shown in the FIG. 34, to decrease the stroke of the pistons. Moving pressure plate 820 by 0.75" decreases the compression ratio from about 12:1 to about 6:1.

Pressure plate 820 is supported by three or more screws 832. Each screw has a gear head 840 which interfaces with a gear 842 on pressure plate 820 such that rotation of screw 832 causes rotation of pressure plate 820 and thus rotation of the remaining screws to insure that the pressure plate is adequately supported. To ensure contact between roller 822 and pressure plate 820, a piston 850 is provided which biases flywheel 722 in the direction opposite to arrow, Z.

Figure 30:
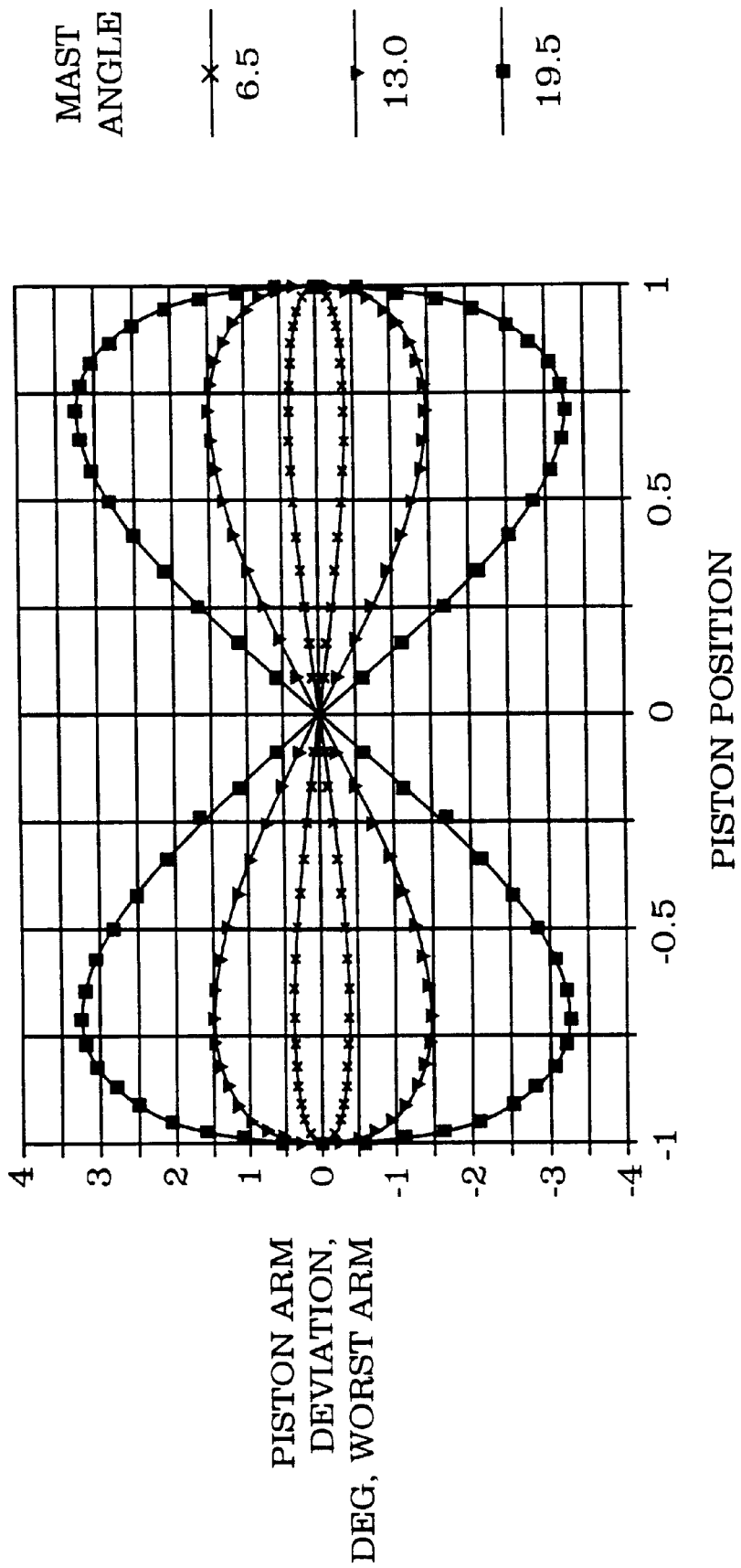
FIG. 30 is a graph showing the figure 8 motion of a non-flat piston assembly.

Referring to FIG. 30, if two cylinders not spaced 180° apart (as viewed from the end) or more than two cylinders are employed in piston assembly 300, the ends of pins 312, 314 coupled to joints 306, 308 will undergo a figure 8 motion. FIG. 30 shows the figure 8 motion of a piston assembly having four double ended pistons. Two of the pistons are arranged flat as shown in FIG. 22 (and do not undergo the figure 8 motion), and the other two pistons are arranged equally spaced between the flat pistons (and are thus positioned to undergo the largest figure 8 deviation possible). The amount that the pins connected to the second set of pistons deviate from a straight line (y axis of FIG. 30) is determined by the swing angle (mast angle) of the drive arm and the distance the pin is from the central pivot point 352 (x axis of FIG. 30).

In a four cylinder version where the pins through the piston pivot assembly of each of the four double ended pistons are set at 45° from the axis of the central pivot, the figure eight motion is equal at each piston pin. Movement in the piston pivot bushing is provided where the figure eight motion occurs to prevent binding.

Figure 31:
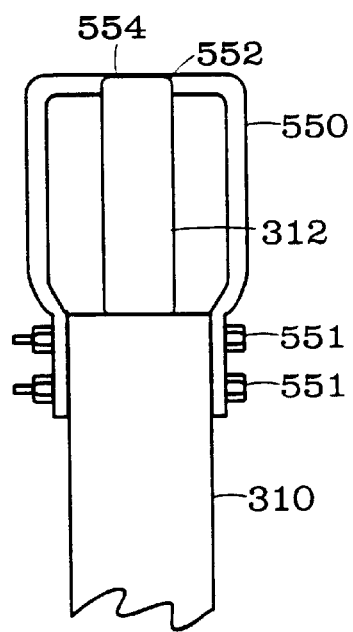
FIG. 31 shows a reinforced drive pin.

When piston assembly 300 is configured for use, e.g., as a diesel engines, extra support can be provided at the attachment of pins 312, 314 to transition arm 310 to account for the higher compression of diesel engines as compared to spark ignition engines. Referring to FIG. 31, support 550 is bolted to transition arm 310 with bolts 551 and includes an opening 552 for receiving end 554 of the pin.

Figure 32A:
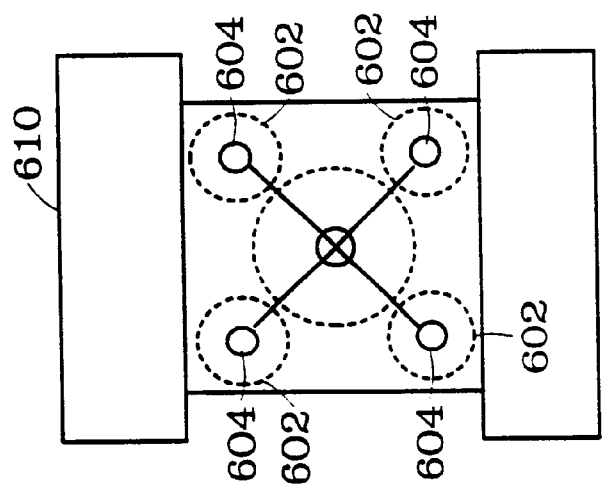
FIG. 32a is an end view of the four cylinder engine, taken along lines 32a, 32a of FIG. 32.
Figure 32:
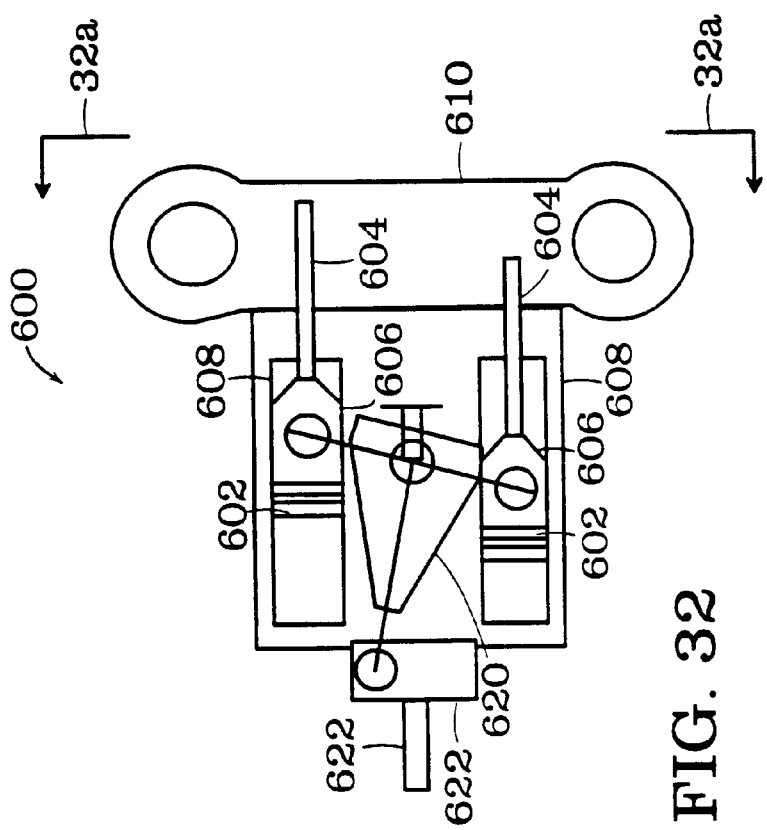
FIG. 32 is a top view of a four cylinder engine for directly applying combustion pressures to pump pistons.

Engines according to the invention can be used to directly apply combustion pressures to pump pistons. Referring to FIGS. 32 and 32a, a four cylinder, two stroke cycle engine 600 (each of the four pistons 602 fires once in one revolution) applies combustion pressure to each of four pump pistons 604. Each pump piston 604 is attached to the output side 606 of a corresponding piston cylinder 608. Pump pistons 604 extend into a pump head 610.

A transition arm 620 is connected to each cylinder 608 and to a flywheel 622, as described above. An auxiliary output shaft 624 is connected to flywheel 622 to rotate with the flywheel, also as described above.

The engine is a two stroke cycle engine because every stroke of a piston 602 (as piston 602 travels to the right as viewed in FIG. 32) must be a power stroke. The number of engine cylinders is selected as required by the pump. The pump can be a fluid or gas pump. In use as a multi-stage air compressor, each pump piston 606 can be a different diameter. No bearing loads are generated by the pumping function (for single acting pump compressor cylinders), and therefore, no friction is introduced other than that generated by the pump pistons themselves.

Referring to FIGS. 38–38B, an engine 1010 having vibration cancelling characteristics and being particularly suited for use in gas compression includes two assemblies 1012, 1014 mounted back-to-back and 180° out of phase. Engine 1010 includes a central engine section 1016 and outer compressor sections 1018, 1020. Engine section 1016 includes, e.g., six double acting cylinders 1022, each housing a pair of piston 1024, 1026. A power stroke occurs when a center section 1028 of cylinder 1022 is fired, moving pistons 1024, 1026 away from each other. The opposed movement of the pistons results in vibration cancelling.

Outer compression section 1018 includes two compressor cylinders 1030 and outer compression section 1020 includes two compressor cylinders 1032, though there could be up to six compressor cylinders in each compression section. Compression cylinders 1030 each house a compression piston 1034 mounted to one of pistons 1024 by a rod 1036, and compression cylinders 1032 each house a compression piston 1038 mounted to one of pistons 1026 by a rod 1040. Compression cylinders 1030, 1032 are mounted to opposite piston pairs such that the forces cancel minimizing vibration forces which would otherwise be transmitted into mounting 1041.

Pistons 1024 are coupled by a transition arm 1042, and pistons 1026 are coupled by a transition arm 1044, as described above. Transition arm 1042 includes a drive arm 1046 extending into a flywheel 1048, and transition arm 1044 includes a drive arm 1050 extending into a flywheel 1052, as described above. Flywheel 1048 is joined to flywheel 1052 by a coupling arm 1054 to rotate in synchronization therewith. Flywheels 1048, 1052 are mounted on bearings 1056. Flywheel 1048 includes a bevel gear 1058 which drives a shaft 1060 for the engine starter, oil pump and distributor for ignition, not shown.

Engine 1010 is, e.g., a two stroke natural gas engine having ports (not shown) in central section 1028 of cylinders 1022 and a turbocharger (not shown) which provides intake air under pressure for purging cylinders 1022. Alternatively, engine 1010 is gasoline or diesel powered.

The stroke of pistons 1024, 1026 can be varied by moving both flywheels 1048, 1052 such that the stroke of the engine pistons and the compressor pistons are adjusted equally reducing or increasing the engine power as the pumping power requirement reduces or increases, respectively.

The vibration cancelling characteristics of the back-to-back relationship of assemblies 1012, 1014 can be advantageously employed in a compressor only system and an engine only system.

Other embodiments are within the scope of the following claims.

What is claimed is:

1. A joint for positioning between first and second elements, the first and second elements being arranged for linear motion along a common axis, comprising:
    an outer member configured for movement relative to the first and second elements along a first axis perpendicular to the common axis, the outer member defining an opening for receiving a drive arm, and
    an inner cylindrical member mounted within the outer member for rotation relative to the outer member about the first axis, the inner member being coupled to the outer member for controlled motion along the first axis with the outer member, the inner member defining an opening for receiving the drive arm.

2. The joint of claim 1 wherein the outer member is configured for movement relative to the first and second elements along a second axis perpendicular to the first axis and the common axis.

3. The joint of claim 1 wherein the outer member defines first and second parallel flat sides, each flat side defining a plane perpendicular to the common axis.

4. The joint of claim 3 further comprising first and second sliding members, the first sliding member for positioning between the first flat side and the first element, the second sliding member for positioning between the second flat side and the second element.

5. The joint of claim 3 wherein the first and second flat sides each comprises a polished surface.

6. The joint of claim 1 wherein the first and second elements each comprises a piston.

7. The joint of claim 1 wherein the first element comprises a piston and the second element comprises a guided rod.

8. The joint of claim 1 wherein the drive arm defines a longitudinal axis, the joint further comprising a mount for holding the drive arm axially stationary while permitting the drive arm to rotate about its longitudinal axis.

9. The joint of claim 8 wherein the mount comprises a cap screw.

10. The joint of claim 1 wherein the opening in the inner member comprises a channel defining a channel axis perpendicular to the first axis.

11. The joint of claim 1 wherein the opening in the outer member comprises a slot for accommodating movement of the drive arm when the inner member rotates relative to outer member.

12. The joint of claim 1 further comprising a thrust bearing for receiving an axial load transferred to the drive arm by the first and second elements.

13. The joint of claim 1 further comprising a sleeve bearing for receiving a normal load transferred to the drive arm by the first and second elements.

14. The joint of claim 1 further comprising a bearing located between the inner and outer members.

15. The joint of claim 1 further comprising a connector for mounting of the first and second elements thereto, the connector defining a cavity, the outer member and the inner member being positioned within the cavity.

16. The joint of claim 1 wherein the outer member is formed as a single component.

17. A joint for positioning between first and second pistons of a double ended piston, the first and second pistons being arranged for linear motion along an axis of the double ended piston, the joint comprising:
    an outer member having first and second parallel flat sides, each flat side defining a plane perpendicular to the double ended piston axis, the outer member being configured for movement relative to the first and second pistons along first and second orthogonal axes, the first and second orthogonal axes being perpendicular to the double ended piston axis, the outer member defining an opening for receiving a drive arm, and
    an inner cylindrical member mounted within the outer member for rotation relative to the outer member about the first orthogonal axis, the inner member being coupled to the outer member for controlled motion along the first axis with the outer member, the inner member defining an opening for receiving the drive arm.

18. The joint of claim 17 wherein the outer member opening comprises a slot and the inner member opening comprises a channel having a channel axis perpendicular to the first orthogonal axis, the joint further comprising a mount for holding the drive arm axially stationary while permitting the drive arm to rotate about its longitudinal axis.

19. The joint of claim 17 further comprising a thrust bearing for receiving an axial load transferred to the drive arm by the first and second pistons, and a sleeve bearing for receiving a normal load transferred to the drive arm by the first and second pistons.

20. A piston assembly, comprising:
    first and second elements configured for linear motion along a common axis, at least one of the first and second elements being a piston,
    a joint positioned between the first and second elements, the joint including
        an outer member configured for movement relative to the first and second elements along a first axis perpendicular to the common axis, the outer member defining a opening for receiving a drive arm, and
        an inner cylindrical member mounted within the outer member for rotation relative to the outer member about the first axis, the inner member being coupled to the outer member for controlled motion along the first axis with the outer member, the inner member defining an opening for receiving the drive arm.

21. The assembly of claim 20 further comprising an intake valve.

22. The assembly of claim 20 further comprising an exhaust valve.

23. The assembly of claim 20 further comprising spark plugs.

24. The assembly of claim 20 comprising an engine.

25. The assembly of claim 20 comprising a pump.

26. The assembly of claim 20 comprising a compressor.

27. The assembly of claim 20 wherein the outer member is configured for movement relative to the first and second elements along a second axis perpendicular to the first axis and the common axis.

28. The assembly of claim 20 wherein the outer member defines first and second parallel flat sides, each flat side defining a plane perpendicular to the common axis.

29. The assembly of claim 20 wherein the first and second elements each comprises a piston.

30. The assembly of claim 20 wherein the first element comprises a piston and the second element comprises a guided rod.

31. The assembly of claim 20 wherein the drive arm defines a longitudinal axis, the joint further comprising a mount for holding the drive arm axially stationary while permitting the drive arm to rotate about its longitudinal axis.

32. A method of reducing side load in a double ended member, the double ended member including first and second elements arranged for linear motion along an axis of the double ended member, the method comprising:

providing a joint located between the first and second elements, the joint including an outer member configured for movement relative to the first and second elements along a first axis perpendicular to the double ended member axis, and an inner cylindrical member mounted within the outer member for rotation relative to the outer member about the first axis, the inner member being coupled to the outer member for controlled motion along the first axis with the outer member, and transferring load between the first and second elements and a drive arm mounted to the joint through two opposed surfaces of the outer member.

33. The method of claim 32 wherein the step of providing includes the outer member being configured for movement relative to the first and second elements along a second axis perpendicular to the first axis and the common axis.

34. The method of claim 32 wherein the step of transferring load includes transferring load between the first and second elements and the drive arm through two opposed flat surfaces of the outer member.

35. The method of claim 32 further comprising driving a member in rotation to produce linear motion in the joint.

36. The method of claim 32 further comprising driving the joint linearly to produce rotary motion in the joint.

37. A method of reducing side load in a double ended piston assembly, the double ended piston assembly including first and second pistons arranged for linear motion along an axis of the double ended piston, the method comprising:

providing a joint located between the first and second pistons, the joint including an outer member configured for movement relative to the first and second pistons along first and second orthogonal axes, the first and second orthogonal axes being perpendicular to the double ended piston axis, the outer member defining two opposed flat surfaces, and an inner cylindrical member mounted within the outer member for rotation relative to the outer member about the first axis, the inner member being coupled to the outer member for controlled motion along the first axis with the outer member, and transferring load between the first and second pistons and a drive arm mounted to the joint through the two opposed flat surfaces.

38. The method of claim 37 further comprising driving a member in rotation to produce linear motion in the joint.

39. The method of claim 37 further comprising driving the joint linearly to produce rotary motion in a member.

40. A piston assembly, comprising:

a plurality of double ended pistons, a transition arm coupled to each of the double ended pistons, the transition arm including a plurality of drive arms, each drive arm defining a drive arm axis, a plurality of joints, each joint for coupling one of the plurality of drive arms to a respective one of the double ended pistons, each joint providing degrees of freedom in four directions between the transition arm and the respective double ended piston, the four degrees of freedom being a) about the drive arm axis, b) along the drive arm axis, c) about an axis perpendicular to the drive arm axis, and d) in the direction of the perpendicular axis, and a universal joint connecting the transition arm to a support.

41. The piston assembly of claim 40 wherein the plurality of pistons include first and second double ended pistons and an axis of rotation of a rotating member coupled to the transition arm and axes of the first and second double ended pistons lie on a common plane.

42. The piston assembly of claim 40 wherein the plurality of pistons include first and second double ended pistons having axes lying on a common plane, and an axis of rotation of a rotating member coupled to the transition arm lies other than on the common plane.

43. The piston assembly of claim 42 wherein the axis of the first double ended piston and the axis of the rotating member lie on a first plane, and the axis of the second double ended piston and the axis of the rotating member lie on a second plane which intersects the first plane at about a 90 degree angle.

44. The assembly of claim 40 further comprising an intake valve.

45. The assembly of claim 40 further comprising an exhaust valve.

46. The assembly of claim 40 further comprising spark plugs.

47. The assembly of claim 40 comprising an engine.

48. The assembly of claim 40 comprising a pump.

49. The assembly of claim 40 comprising a compressor.

50. A joint for positioning between first and second elements, the first and second elements being arranged for linear motion along a common axis, comprising:

an outer member configured for movement relative to the first and second elements along a first axis perpendicular to the common axis, the outer member defining an opening for receiving a drive arm, an inner member mounted within the outer member for rotation relative to the outer member about a second axis perpendicular to the first axis and the common axis, the inner member defining an opening for receiving the drive arm, and a thrust bearing for receiving an axial load transferred to the drive arm by the first and second elements.

51. A joint for positioning between first and second elements, the first and second elements being arranged for linear motion along a common axis, comprising:

an outer member configured for movement relative to the first and second elements along a first axis perpendicular to the common axis, the outer member defining an opening for receiving a drive arm, an inner member mounted within the outer member for rotation relative to the outer member about a second axis perpendicular to the first axis and the common axis, the inner member defining an opening for receiving the drive arm, and a sleeve bearing for receiving a normal load transferred to the drive arm by the first and second elements.

52. A joint for positioning between first and second elements, the first and second elements being arranged for linear motion along a common axis, comprising:

an outer member configured for movement relative to the first and second elements along a first axis perpendicular to the common axis, the outer member defining an opening for receiving a drive arm, an inner member mounted within the outer member for rotation relative to the outer member about a second axis perpendicular to the first axis and the common axis, the inner member defining an opening for receiving the drive arm, and a bearing located between the inner and outer members.

* * * * *

UNITED STATES PATENT AND TRADEMARK OFFICE
CERTIFICATE OF CORRECTION

PATENT NO. : 6,446,587 B1
DATED : September 10, 2002
INVENTOR(S) : Albert E. Sanderson and Robert A. Sanderson It is certified that error appears in the above-identified patent and that said Letters Patent is hereby corrected as shown below:

Title page,
Item [56], References Cited, FOREIGN PATENT DOCUMENTS, replace
"EP    0052387       10/1991" with -- EP    0052387       10/1981 --.

Drawings,
Figure 37, "$D_1$" (left side of figure) should be -- $D_2$ --.
Figure 38, "10x" should be -- 1036 --.

Column 5,
Line 10, replace "an" with -- and --; replace "18" with -- 17 --; and
Line 26, replace "Sa" with -- 5a --.

Column 10,
Line 5, replace "PL" with -- $P_L$ --; and
Line 31, replace "$D_2$" with -- $D_1$ --.

Signed and Sealed this

Second Day of December, 2003

JAMES E. ROGAN
*Director of the United States Patent and Trademark Office*